US007187996B2

(12) United States Patent
Tanaka et al.

(10) Patent No.: US 7,187,996 B2
(45) Date of Patent: Mar. 6, 2007

(54) PRESS MACHINE

(75) Inventors: Yasuhiko Tanaka, Machida (JP); Hideki Hayashi, Sagamihara (JP); Masaki Senda, Machida (JP)

(73) Assignee: Aida Engineering, Ltd., Sagamihara (JP)

( * ) Notice: Subject to any disclaimer, the term of this patent is extended or adjusted under 35 U.S.C. 154(b) by 105 days.

(21) Appl. No.: 10/325,632

(22) Filed: Dec. 20, 2002

(65) Prior Publication Data

US 2003/0116037 A1 Jun. 26, 2003

(30) Foreign Application Priority Data

Dec. 21, 2001 (JP) ............................ 2001-388835
Dec. 28, 2001 (JP) ............................ 2001-400860

(51) Int. Cl.
*G06F 19/00* (2006.01)

(52) U.S. Cl. ........................ 700/206; 700/165; 100/43

(58) Field of Classification Search ................ 700/165, 700/206; 100/4, 43, 35
See application file for complete search history.

(56) References Cited

U.S. PATENT DOCUMENTS 4,150,616 A 4/1979 Schneider et al.
4,177,517 A * 12/1979 Mette et al. ................ 702/151
4,480,538 A * 11/1984 Yoshida ....................... 100/48
5,253,572 A * 10/1993 Uehara et al. ................ 100/48
5,379,688 A * 1/1995 Ishii ............................ 100/35
5,544,577 A 8/1996 Kato
5,588,344 A 12/1996 Chun
5,673,615 A * 10/1997 Kawakami ................... 100/35
5,746,122 A 5/1998 Gietz et al.
5,868,020 A * 2/1999 Delaney et al. .............. 72/21.3
6,470,796 B2 * 10/2002 Hayashi ....................... 100/43
6,520,077 B1 * 2/2003 Minagawa et al. ......... 100/289
2003/0019267 A1 * 1/2003 Futamura et al. ............ 72/21.3
2003/0206805 A1 * 11/2003 Bishop et al. ............. 417/44.2

FOREIGN PATENT DOCUMENTS

CA 2 323 247 4/2001
CN 1139403 A 1/1997
EP 63-281800 11/1988
EP 0 536 804 A2 4/1993
EP 1 074 380 2/2001
JP 63-180400 7/1998
JP 11-033799 2/1999
JP 2000-176698 6/2000
JP 2002-144099 5/2002
KR 160534 1/1999

* cited by examiner

*Primary Examiner*—Albert W. Paladini
*Assistant Examiner*—Alexander Kosowski
(74) *Attorney, Agent, or Firm*—Burr & Brown

(57) ABSTRACT

A press machine uses a crank mechanism which can perform pressing by a pressing force control when a slide exists in a pressing region. When the slide is determined to exist between an initial position and a switching position to the pressing region, the slide is moved down by rotating a motor regularly by a position control system. When the slide is determined to exist in the pressing region, pressing is performed by moving down the slide such that a slide pressing force becomes equal to a set slide pressing force by a pressing force control system.

11 Claims, 17 Drawing Sheets

FIG. 17A
FIG. 17B
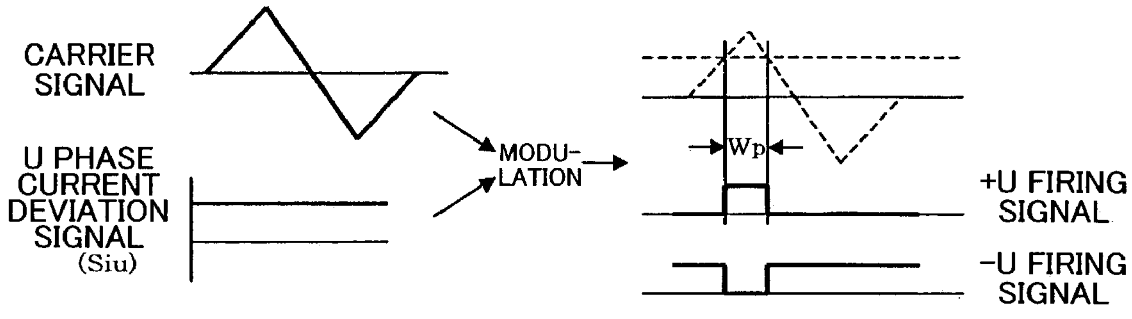
FIG. 18
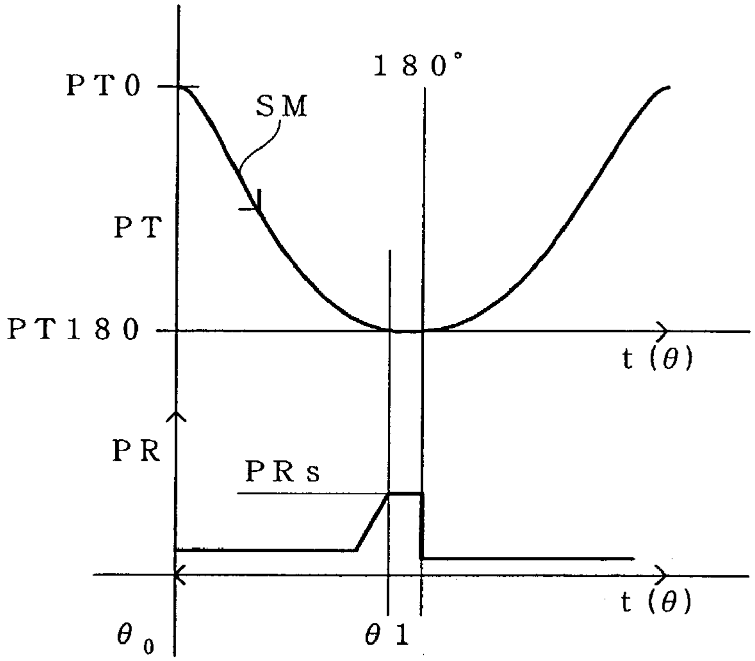

PRESS MACHINE

Japanese Patent Application No. 2001-388835 filed on Dec. 21, 2001 and Japanese Patent Application No. 2001-400860 filed on Dec. 28, 2001 are hereby incorporated by reference in their entirety.

BACKGROUND OF THE INVENTION

The present invention relates to a press machine for pressing while moving a slide up and down by rotating a crankshaft.

A press machine is formed to be able to operate to press by driving a drive mechanism (for example, crank mechanism or the like) by a drive source (for example, electric motor) while moving up and down a slide connected thereto.

Press speed is defined as a time period required for moving a slide up and down between a top dead center and a bottom dead center once and is designated as revolution speed of a drive source (electric motor). Specifically, the press speed is designated as SPM (Stroke Per Minute). That is, when importance is given to productivity, speed of a drive source (electric motor) is controlled by using a speed control system (speed control apparatus). Target speed is adjusted in correspondence with whether a gear or a speed reducer is interposed between the electric motor and the crankshaft.

Meanwhile, in pressing, a product shape is determined by determining a position of a slide and therefore, when importance is given to a product accuracy, a drive source (electric motor) is subjected to position control by using a position control system (position control apparatus). For example, position control is carried out while inputting to switch a target position at every constant cycle in accordance with slide motion constituting a corresponding relationship between a crankshaft angle and a slide position.

Further, also in the case of the position control system, at a final stage thereof, similar to the case of the speed control system, the drive source (electric motor) is subjected to speed control. Further, also in the case of the speed control system, at a first stage, similar to the case of the position control system, there is frequently a case of setting the speed as a relationship (position) between time and rotational angle of the crankshaft.

However, depending on a kind of a product and a method of working the product, for example, when a helical gear or the like is forged (pressed), there is also a case in which pressing force effects stronger influence on the acceptability of the product than position. In this way, according to the prior art, a pressure control system (hydraulic press machine) constituting the drive source by hydraulic pressure is used and for example, there is carried out a pressure control for maintaining slide pressing force at a predetermined pressing force while inputting to switch target pressing force at every constant cycle in accordance with a corresponding relationship among a position of a slide connected to a hydraulic cylinder, a crankshaft angle and pressing force.

Meanwhile, according to a press (hydraulic press machine) constituting the drive source by hydraulic pressure, in view of the structure, energy loss by heat generation and cooling is considerable and there also poses a problem in view of environment such as oil leakage. It is indicated from such a point of view that adoption of a hydraulic press machine is intended to be avoided.

Hence, it has been tried to use a pressure control section constituting a drive source by a linear motor enabling a motion similar to that of the case of a hydraulic press machine and having a characteristic in which pressing force is prosectional to motor current without using a crank mechanism (linear motor type press machine). However, in the case of the linear motor type, in view of the structure, it is difficult to achieve large thrust. Further, since a coil side unit and a permanent magnet side unit having strong attractive force are constituted by separate units, it is difficult to deal therewith when the permanent magnet side unit is integrated to the press machine.

In the case of a rotating electric motor type having a crank mechanism, the problem of the linear motor type is not posed and torque can be increased by interposing a speed reducer or the like. However, in the case of the rotating electric motor type, a crank mechanism constituting a rotation-linear line converting mechanism is indispensable and therefore, regardless of presence or absence of a speed reducer or a gear, there poses a problem that a relationship between slide pressing force and motor torque is changed and the pressing force becomes infinite theoretically at a bottom dead center (or, immediately before bottom dead center). Further, in the case of a ball screw shaft type adopting a ball screw shaft mechanism in place of a crank mechanism, similar to the case of the linear motor type, it is difficult to achieve large thrust. Further, in forming a product, pressing force is exerted to a ball screw, friction force is increased and wear of the ball screw poses a problem.

In this way, in the prior art, when, for example, a helical gear or the like is forged (pressed), although it is recognized that there is unresolved constitutional problems (large energy loss) or environmental problems, the hydraulic press machine is obliged to be adopted by acquiescing to the problems as a risk.

Further, the press machine of the conventional art for pressing while moving the slide up and down by rotating the crankshaft, is constituted to selectively transmit and separate rotational energy accumulated in a flywheel to and from the crankshaft via clutch & brake.

In such a press machine, die height setting operation is carried out by adjusting a position of an upper die in an up-and-down direction or a position of a lower die in the up-and-down direction before a press operation. A position of a bottom dead center of a slide in this case is determined by a crank mechanism (crankshaft). Therefore, even when respective constituent elements (for example, connecting rod, frame) are elongated or contracted by heat generation or the like during the press operation, a position of a bottom dead center (and therefore, die height) necessary for canceling the elongation or the contraction cannot be adjusted.

That is, adjustment of the bottom dead center position (die height) is carried out by, for example, manually or electrically driving to adjust a vertical position adjusting apparatus mounted to a side of a bolster (lower die) or a slide position adjusting apparatus mounted to a side of the slide (upper die) after stopping the press operation.

Meanwhile, among requests accompanied by further diversification and high quality formation, that is, among requests to carry out plastic deformation (pressing) by a press machine, there are a case of intending to carry out forming by giving importance to the position of the bottom dead center of the slide and a case of intending to carry out forming by giving importance to pressing force of the slide.

In this case, when the bottom dead center position of the slide is delicately changed during the press operation, even with the same mold (upper and lower dies) and a work (material) having the same shape or the like, the pressing force of the slide is changed. Further, the pressing force of the slide is complicatedly changed also by an accuracy (error or dispersion) of a thickness of the work (material) which has nothing to do with the change in the bottom dead center position of the slide.

Hence, in order to meet the request of intending to carry out forming by giving importance to the pressing force of the slide, the pressing force of the slide has been tried to adjust during a press operation by using a press machine which is not provided with a crank mechanism (crankshaft) (for example, a trial machine (ball screw type press machine) constructed to be able to move the slide in the up-and-down direction by rotating the ball screw by an electric motor).

According to a trial result by the ball screw type press machine, adjustment of the pressing force per se is possible. However, the pressing force is directly exerted to the ball screw as reaction and therefore, wear of the ball screw is enormous. Therefore, the ball screw type press machine is not suitable for a press machine needing large pressing force. Similarly, also the case of directly driving the slide by constituting the drive source by the linear motor (linear motor type press machine) is not suitable for large pressing force.

BRIEF SUMMARY OF THE INVENTION

The present invention may provide a press machine using a crank mechanism which can carry out pressing by a pressing force control when a slide position is present in a pressing region.

Further, the present invention may also provide a press machine using a crank mechanism which can control a slide pressing force during a press operation and can easily achieve a large pressing force.

According to a first aspect of the invention, there is provided a press machine comprising a crankshaft, a motor connected to the crankshaft and driven to rotate reversibly, a slide moving up and down by rotation of the motor, a control section controlling the up and down movement of the slide, and a motor drive control section controlling the drive of the motor based on an output from the control section. The control section comprises a position control system and a pressing force control system. The position control system moves down the slide from an initial position to a pressing region by controlling the motor to rotate regularly, and when the slide is determined to exist in the pressing region, the control section substitutes the position control system with the pressing force control system. The pressing force control system performs pressing by moving down the slide such that a slide pressing force becomes equal to a set pressing force by controlling the motor to rotate regularly.

In this press machine, by controlling the motor to rotate regularly by the position control system, the slide can be moved down at high speed until the pressing region and therefore, high productivity can be ensured. Further, in the pressing region, pressing can be carried out by pressing force control for making the slide pressing force equal to the set slide pressing force and therefore, an excellent forged product can be reliably produced.

In the press machine according to the first aspect of the present invention, the control section may substitute the pressing force control system with the position control system after completing the pressing and after the slide reaches a position before a bottom dead center. The position control system may move up the slide to the initial position by controlling the motor to rotate reversely.

With this configuration, after pressing and after the slide position reaches the position before the bottom dead center, the pressing force control system is substituted with the position control system again, the slide is moved up without passing the bottom dead center position and therefore, an unnecessary movable stroke can be shortened, that is, production tact time can be shortened.

In the press machine according to the first aspect of the present invention, the position control system may control the position of the slide in accordance with a set slide position signal outputted based on a set motion instructing pattern.

With this configuration, a signal in correspondence with the slide position corresponding to a crank angle (set slide position signal) can be inputted to the position control system based on the motion instructing pattern of the slide which is set previously, or on the spot. The motion instructing pattern can be set by, for example, a graph of a relationship between a crank angle (rotational angle of crankshaft) and the slide position. Information for scheming to reduce impact force of the slide when the slide is brought into the working region and minimize a time period in which a slide moves up and down (one reciprocation) in a region excluding the working region (maximize speed) can be incorporated in the motion instructing pattern of the slide.

In the press machine according to the first aspect of the present invention, the pressing force control system may control the slide pressing force in accordance with a set slide pressing force signal outputted based on a set pressing force instructing pattern.

With this configuration, a signal corresponding to the slide pressing force according to the crank angle (set slide pressing force signal) is inputted to the pressing force control system based on a slide pressing force instructing pattern which is set previously, or on the spot. The pressing force instructing pattern can be constituted by, for example, a graph of a relationship between the crank angle (rotational angle of the crankshaft) and the pressing force. The pressing force instructing pattern can include one pressing force or two or more pressing forces within the working region.

In the press machine according to the first aspect of the present invention, the set slide pressing force signal may be outputted as a torque value of the motor calculated by inputting a detected rotational angle of the crankshaft to a relational expression of the rotational angle of the crankshaft, the slide pressing force and a torque of the motor.

With this configuration, when the detected rotational angle of the crankshaft is inputted, the signal in correspondence with the slide pressing force corresponding to the detected crank angle (set slide pressing force signal) is calculated by utilizing a relational expression, and outputted as a value of a motor torque. The relational expression can be constituted by an equation for calculating the slide pressing force (motor torque) by using the crank angle (rotational angle of crankshaft) and the motor torque (slide pressing force) as variables.

In the press machine according to the first aspect of the present invention, the set slide pressing force signal may be outputted as a torque value of the motor which is read by comparing a detected rotational angle of the crankshaft with storage information storing a relationship among the rotational angle of the crankshaft, the slide pressing force and a torque of the motor.

With this configuration, when the detected rotational angle of the crankshaft is inputted, in reference to storage related information, a signal in correspondence with the slide pressing force corresponding to the detected crank angle at the time concerned (set slide pressing force signal) is extracted and outputted as a value of the motor torque. The storage related information can be constituted by a database forming a table of a relationship, for example, among the crank angle (rotational angle of the crankshaft), the slide pressing force and the motor torque.

In the press machine according to the first aspect of the present invention, a completion of the pressing may be detected by monitoring one of an elapsed time period and a rotational angle of the crankshaft.

With this configuration, a completion of the pressing (for example, forging) in the working region can be determined by monitoring a case in which an elapsed time period, after the slide is brought into the working region, exceeds a previously set working time period or a case in which the detected rotational angle of the crankshaft (crank angle) becomes equal to or larger than a previously set finish crank angle.

According to a second aspect of the present invention, there is provided a press machine comprising a crankshaft, a motor connected to the crankshaft, a slide moving up and down by rotation of the motor, and a control section controlling the up and down movement of the slide. The control section comprises a pressing force adjusting mechanism adjusting a relative distance between the crankshaft and the slide in an up-and-down direction, a pressing force calculating section calculating a pressing force exerted on the slide as a calculated pressing force, a pressing force determining section comparing the calculated pressing force with a set pressing force, and a control signal outputting section outputting a control signal. The pressing force calculating section calculates the pressing force exerted on the slide based on a rotational angle of the crankshaft and a motor drive current both of which are detected before a bottom dead center position. The pressing force determining section determines whether the calculated pressing force is larger than the set pressing force and when the calculated pressing force is determined to be larger than the set pressing force, the control signal outputting section generates the control signal for moving up the slide and outputs to the pressing force adjusting mechanism. When the calculated pressing force is determined to be smaller than the set pressing force, the control signal outputting section generates the control signal for moving down the slide and outputs to the pressing force adjusting mechanism. The pressing force adjusting mechanism increases or decreases the relative distance so as to be adjusted by the control signal, and maintains the adjusted relative distance after finishing the adjustment.

In the press machine according to the second aspect of the present invention, the slide is moved up and down while rotating the crankshaft by the motor and therefore, large pressing force can be obtained. During the press operation, when the slide pressing force calculated based on the rotational angle of the crankshaft and the motor drive current detected before the bottom dead center position, is determined to be larger than the previously set pressing force, the control signal outputting section can generate the control signal for moving up the slide and output to the pressing force adjusting mechanism. Conversely, when the calculated slide pressing force is determined to be smaller than the set pressing force, the control signal outputting section can generate the control signal for moving down the slide and output to the pressing force adjusting mechanism.

Then, by the control signal, the pressing force adjusting mechanism can increase or decrease the relative distance between the crankshaft and the slide in an up-and-down direction, so as to be adjusted by, for example, a distance corresponding to rise and fall of the control signal level. Further, the adjusted relative distance in the up-and-down direction can be maintained as it is. That is, during the press operation, slide pressing force at a vicinity of the bottom dead center position (within pressing region) can be automatically adjusted to be constant (set pressing force) without switching between the unlocked state and the locked state and without being recognized by an operator.

In the press machine according to the second aspect of the present invention, the control signal may be a unit control signal, the unit control signal may be outputted from the control signal outputting section to the pressing force adjusting mechanism, and the pressing force adjusting mechanism may increase or decrease the relative distance so as to be adjusted, by moving the slide up or down by a set unit amount.

With this configuration, during the press operation, when the calculated slide pressing force is determined to be larger than the previously set pressing force, the control signal outputting section can generate the unit control signal (for example, signal at a level corresponding to a minimum resolution on a minus side) for moving up the slide by the set unit amount and output to the pressing force adjusting mechanism. Conversely, when the calculated side pressing force is determined to be smaller than the set pressing force, the control signal outputting section can generate a unit control signal (for example, signal at a level corresponding to a minimum resolution on a plus side) for moving down the slide by the set unit amount and output to the pressing force adjusting mechanism.

Then, the pressing force adjusting mechanism can increase or decrease the relative distance between the crankshaft and slide in the up-and-down direction, so as to be adjusted, by the set unit amount by the set control signal. Further, the adjusted relative distance in the up-and-down direction can be maintained as it is. That is, the slide pressing force at a vicinity of the bottom dead center position (within pressing region) during the press operation can be automatically adjusted to be constant without being recognized by the operator.

In the press machine according to the second aspect of the present invention, the control signal may be a correction control signal. When the calculated pressing force is determined to be larger than the set pressing force by a specified pressure value or more, the control signal outputting section may generate the correction control signal for moving the slide up by a distance corresponding to the specified pressure value and may output to the pressing force adjusting mechanism. When the calculated pressing force is determined to be smaller than the set pressing force by a specified pressure value or more, the control signal outputting section may generate the correction control signal for moving the slide down by a distance corresponding to the specified pressure value and may output to the pressing force adjusting mechanism. The pressing force adjusting mechanism may increase or decrease the relative distance so as to be adjusted, by the correction control signal, so that the set pressing force is maintained.

With this configuration, during the press operation, when the calculated slide pressing force is determined to be larger than the previously set pressing force by a specified pressing force value, the control signal outputting section can generate the correction control signal for moving up the slide by an amount corresponding to the specified pressure value and output to the pressing force adjusting mechanism. Conversely, when the calculated slide pressing force is determined to be smaller than the set pressing force, the control signal outputting section can generate the correction control signal for moving the slide down by an amount corresponding to the constant pressure value and output to the pressing force adjusting mechanism.

Then, the pressing force adjusting mechanism can increase or decrease the relative distance between the crankshaft and the slide in the up-and-down direction so as to be adjusted by an amount corresponding to the specified pressure value by the correction control signal. Further, the adjusted relative distance in the up-and-down direction can be maintained as it is. That is, during the press operation, the slide pressing force at a vicinity of the bottom dead center position (within pressing region) can be automatically adjusted to be constant (set pressing force) without being recognized by the operator.

The press machine according to the second aspect of the present invention, may further comprise: a temporary stop control section temporarily stopping the slide after passing the bottom dead center position, at a set point position when the control signal is generated and outputted; and a slide redriving control section restarting the up and down movement of the slide after the adjustment of the relative distance performed while the slide is being stopped temporarily at the set point position.

With this configuration, during the press operation, when the control signal (unit control signal or correction control signal) is generated and outputted, the temporary stop control section can temporarily stop the slide at the set point position by stopping the motor when the slide is moved up to the set point position after passing the bottom dead center position. Further, in this time period of being stopped temporarily, the relative distance in the up-and-down direction can be adjusted, and after completing adjusting the relative distance, the operation of moving up and down the slide can be restarted by operating the slide redriving control section.

In the press machine according to the second aspect of the present invention, the pressing force adjusting mechanism may increase or decrease the relative distance so as to be adjusted by the control signal in an unlocked state, and may maintain the relative distance which has been adjusted by the control signal during a locked state.

With this configuration, the pressing force adjusting mechanism can increase or decrease the relative distance between the crankshaft and slide in the up-and-down direction so as to be adjusted, by a distance corresponding to, for example, rise and fall of the control signal level based on the control signal. Further, the adjusted relative distance in the up-and-down direction can be maintained as it is during the locked state. That is, during the press operation, the slide pressing force at a vicinity of the bottom dead center position (within pressing region) can automatically be adjusted to be constant (set pressing force) without being recognized by the operator.

In the press machine according to the second aspect of the present invention, the pressing force adjusting mechanism may increase or decrease the relative distance so as to be adjusted by a unit control signal in an unlocked state, and may maintain the relative distance which has been adjusted by the unit control signal during a locked state.

With this configuration, the pressing force adjusting mechanism can increase or decrease the relative distance between the crankshaft and slide in the up-and-down direction so as to be adjusted by a set unit amount by the unit control signal. Further, the adjusted relative distance in the up-and-down direction can be maintained as it is during a locked state. That is, the slide pressing force at a vicinity of the bottom dead center position (within pressing region) during the press operation can be automatically adjusted to be constant without being recognized by the operator.

In the press machine according to the second aspect of the present invention, the pressing force adjusting mechanism may increase or decrease the relative distance so as to be adjusted by a unit control signal in an unlocked state, and may maintain the relative distance which has been adjusted by the unit control signal in a locked state.

By constituting such a constitution, the pressing force adjusting mechanism can increase or decrease the relative distance between the crankshaft and the slide in an up-and-down direction so as to be adjusted, by an amount corresponding to the specified pressure value by the correction control signal in the unlocked state. Further, the adjusted relative distance in the up-and-down direction can be maintained as it is during the locked state. That is, the slide pressing force at a vicinity of the bottom dead center position (within pressing region) during the press operation can be automatically adjusted to be constant (set pressing force) without being recognized by the operator.

The press machine according to the second aspect of the present invention, may further comprise: a temporary stop control section temporarily stopping the slide after passing the bottom dead center position at a set point position when the control signal is generated and outputted; a state switching control section switching the pressing force adjusting mechanism to the unlocked state while the slide is being temporarily stopped at a set point position, and switching the pressing force adjusting mechanism to the locked state after the relative distance has been adjusted; and a slide redriving control section restarting the up and down movement of the slide after being switched to the locked state by the state switching control section.

With this configuration, during the press operation, in the case where the control signal (unit control signal or correction control signal) is generated and outputted, when the slide is moved up to the set point position (for example, top dead center position or a vicinity of top dead center position) after passing the bottom dead center position, the slide can be temporarily stopped at the set point position by stopping the motor. Then, the state switching control section switches the pressing force adjusting mechanism to the unlocked state. Further, after completing adjusting the relative distance in the up-and-down direction, the state is switched to the locked state again. After switching to the locked state in this way, the slide redriving control section works, and thereby the operation of moving up and down the slide can be restarted.

BRIEF DESCRIPTION OF THE DRAWINGS

FIG. 17A and FIG. 17B are time charts for explaining operation of the PWM control section (drive section);

FIG. 18 is a time chart for explaining a relationship between slide motion and pressing force at a vicinity of a bottom dead center position;

DETAILED DESCRIPTION OF THE INVENTION

Figure 1:
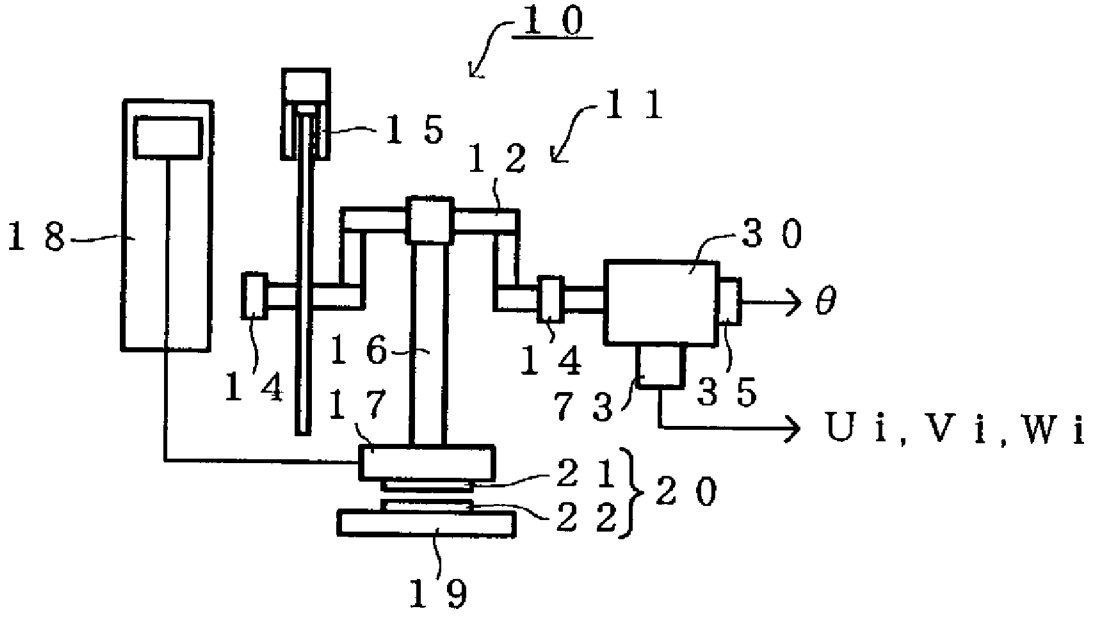
FIG. 1 is an outline view of a press machine for explaining a first embodiment of the invention.

An explanation will be given of embodiments of the invention in reference to the drawings as follows.

First Embodiment

As shown by FIG. 1 through FIG. 8A and FIG. 8B, the press machine 10 moves a slide 17 up and down by controlling to drive to rotate a motor 30 connected to a crankshaft 12 reversely. The press machine 10 moves down the slide 17 by controlling to drive to rotate the motor 30 regularly by a position control system 60 via a motor drive control section 70 when a position PT of the slide 17 is determined to be present between an initial position (top dead center position PT0) to a position of switching to a pressing region (θ1 through θ2). The press machine 10 moves down the slide 17 by making slide pressing force (PR) equal to set slide pressing force (PRs) by controlling to drive to rotate the motor 30 regularly by the pressing force control system (for example, slide pressing force instructing section 58) substituted for the position control system 60 via a motor drive control section 70 when the position PT of the slide 17 is determined to be present in the pressing region (θ1 through θ2 . . . PT1 through PT2). Thereby, pressing can be carried out. The press machine 10 can move up the slide 17 to return to the initial position (PT0) by controlling to drive to rotate the motor 30 reversely by substituting the pressing force control system 58 with the position control system 60 again after pressing has been completed and after the slide position has reached a position before a bottom dead center prior to reaching the bottom dead center position (PT180) (a position after passing PT2 and before reaching PT180 (PT180-α)).

In FIG. 1, a drive mechanism of the press machine 10 is constituted by a crank mechanism 11 including the crankshaft 12 and the like. The crankshaft 12 is rotatably supported by bearings 14 and can be controlled to drive to rotate reversibly (regular rotation, reverse rotation) by controlling to rotate the motor 30 comprising an AC (alternating current) servo motor directly connected thereto. Alternatively, motor 30 may comprise a DC (direct current) servo motor. Notation 15 designates a mechanical brake.

Further, the crankshaft 12 and the motor 30 may be connected indirectly via a gear (speed reducer). When the gear (speed reducer) is interposed therebetween, higher pressing force can be achieved.

The slide 17 is mounted to a frame main body (not illustrated) slidably in an up-and-down direction and engaged to a weight balance apparatus 18. Therefore, when the crankshaft 12 is driven to rotate, the slide 17 the weight of which is balanced can be driven to move up and down via a connecting rod 16. A die 20 comprises an upper die 21 connected to a side of the slide 17 and a lower die 22 connected to a side of a bolster 19. According to the die 20 of the embodiment, a main object thereof is forging (coining or the like).

The motor 30 is the AC servo motor. Respective current signals Ui, Vi, Wi in correspondence with motor drive currents of respective phases U, V, W of the motor 30 are detected by a current detecting section 73 shown in FIG. 1 and FIG. 2. Further, the motor 30 is connected with an encoder 35.

The encoder 35 includes a number of optical slits and an optical detector in principle and outputs a rotational angle (crank angle) θ of the motor 30 (crankshaft 12). The embodiment includes a signal converter (not illustrated) for converting the rotational signal θ (pulse signal) to the position PT in the up-and-down direction (pulse signal) of the slide 17 and outputting a converted value.

Figure 2:
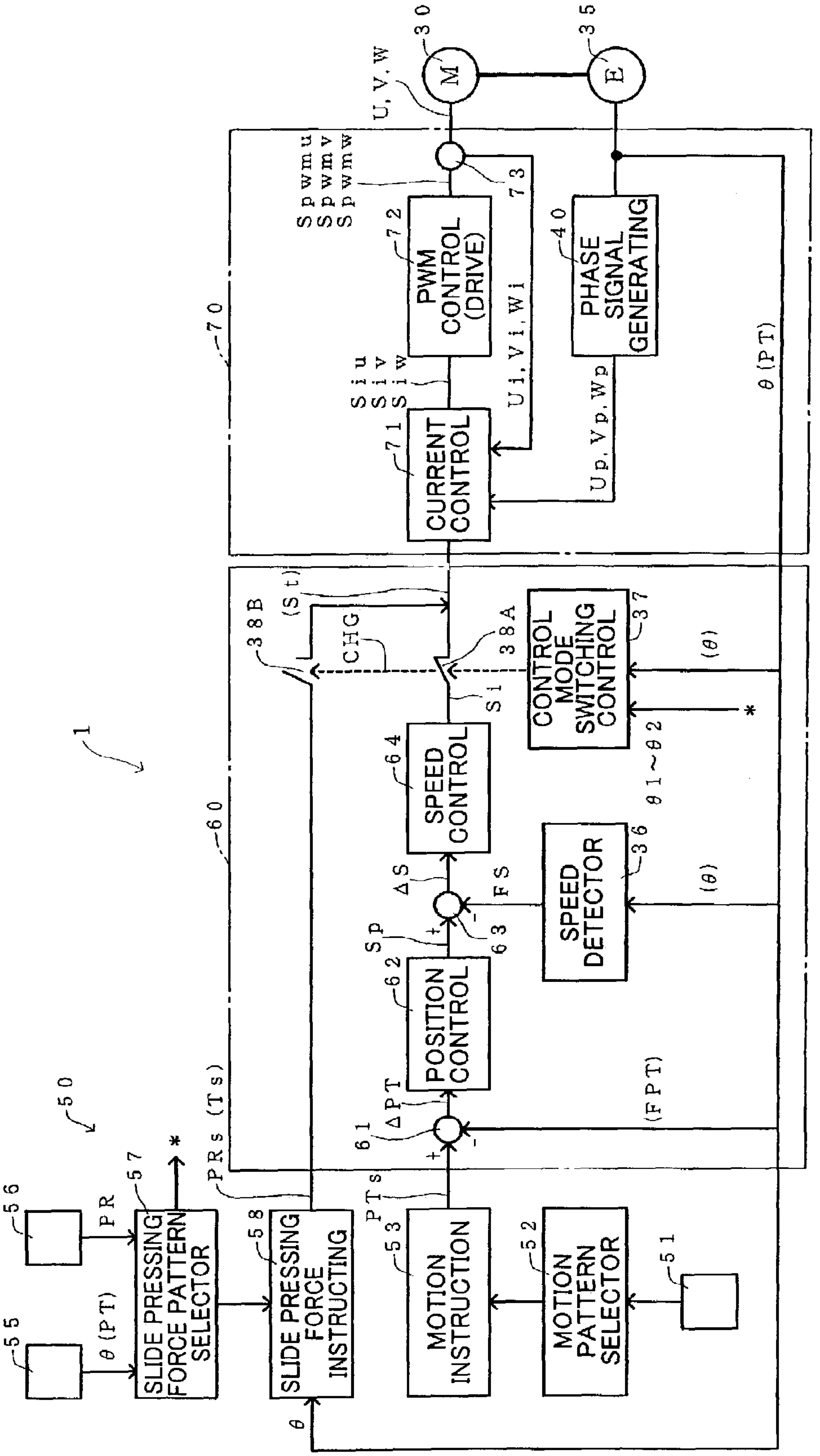
FIG. 2 is a block diagram for explaining a control section (setting, selecting and instructing sections, position control system, pressing force control system)

In FIG. 2, a control section 1 comprises a setting, selecting and instruction section 50, a pressing force control system (slide pressing force instructing section 58), the position control system 60, a control mode switching control section 37 and the motor drive control section 70.

Figure 9:
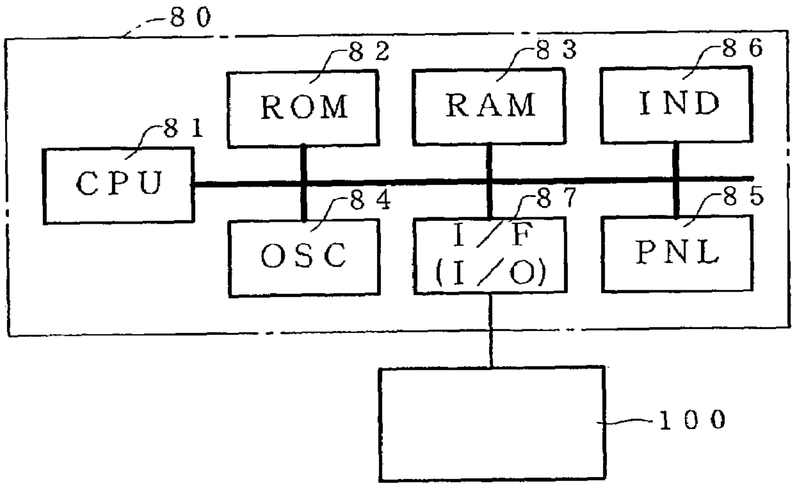
FIG. 9 is a block diagram for explaining a control section (setting, selecting and instructing section, position control system, pressing force control system) according to a second embodiment of the invention.

Further, there is provided a press operation drive control section (not illustrated) connected to these (50, 58, 60, 37, 70 and the like . . . in correspondence with sections 80, 100 of FIG. 9) and necessary for a specific press operation. The press operation drive control section can be constructed by using a sequencer, a logic circuit or a computer. A representative operation of the press operation drive control section is as shown by, for example, FIG. 10 for explaining operation of a second embodiment (FIG. 9).

A speed setter 51, a motion pattern selector 52 and a motion instruction section 53 are included for position control of the setting, selecting and instructing section 50 and constituted to be able to output the set slide position signal PTs to a position comparator 61 of the position control system 60. The set slide position signal PTs is a signal for instructing previously set and selected motion. The motion instructing section 53 of the setting, selecting and instructing section 50 constitutes a section of the position control system 60.

A desired motion pattern (t-PT curve) can be selected from a plurality of previously set and stored motion patterns (elapsed time t-slide position PT) by using the motion pattern selector 52. The selected motion pattern (t-PT curve)

is outputted to the motion instruction section 53 along with motor revolution speed (or SPM . . . slide speed) (so-to-speak slide stroke number (SPM)) set by using the speed setter 51.

Further, the motion pattern selector 52 may be constituted to be able to form (or select) the motion pattern (t-PT curve) by corresponding and inputting the elapsed time t from start of operation and the respective slide position PT at the occasion.

Although the speed setter 51 can set the revolution speed (for example, 100 RPM) of the motor 30 by "manual", when "automatic" is selected, the selection is dealt with such that previously selected and set highest revolution speed is selected. The speed setter 51 may be constituted by an SPM setter, a production speed setter or the like.

The motion instruction section 53 is constituted by a structure of a type of issuing position pulses for outputting the set slide position signal PTs by pulses in accordance with the selected motion pattern (t-PT curve). For example, when the motor revolution speed set by using the speed setter 51 is 120 RPM, the number of pulses outputted per rotation (360 degrees) from the encoder 35 is a million pulses and an outputting cycle time is 5 mS, the number of pulses outputted per cycle (5 mS) is 10,000 pulses (=(1,000,000×120/60)×0.005).

Further, depending on the set motor revolution speed or magnitude of load, as a measure for preventing rapid torque change, it is preferable to provide an accelerating section (for successively increasing an output pulse number) immediately after starting and a decelerating section (for successively reducing the output pulse number) immediately before stopping. Further, when setting of the revolution speed is either of "manual" and "automatic", revolution speed when the slide is brought into the pressing region can be set to low speed which is decelerated relative to revolution speed prior thereto.

Here, a target value signal of the position control system 60 in position control is understood as a signal in correspondence with the slide position outputted based on the set motion instructing pattern (set slide position signal PTs). That is, the position control system 60 is inputted with a signal (target value signal) corresponding to the slide position PT in correspondence with the elapsed time period t until corresponding time point based on the motion instructing pattern of the slide 17 which is set previously or at the occasion. The motion instructing pattern of the slide 17 can be inputted with information for scheming to alleviate impact force of the slide when the slide is brought into the working region or minimizing a time period of moving up and down the slide (one reciprocal movement) at other region excluding the working region (maximizing speed of the slide). The motor revolution speed set by using the speed setter 51 is reflected to the motion instructing pattern (t-PT curve). Thereby, productivity can further be promoted while achieving a reduction in impact or noise in pressing.

The position control system 60 includes the motion instruction section 53, the position comparator 61, a position control section 62, a speed comparator 63 and a speed control section 64 and is constituted to be able to output current instruction signal Si to a current control section 71. Further, a speed detector 36 and the control mode switching control section 37 are expressed in the form of being included in the position control system 60 for convenience of illustration. Further, the motion instructing section 53 is expressed in the form of not being included in the position control system 60 for convenience of illustration.

First, the position comparator 61 compares the set slide position signal PTs which is the target value signal from the motion instructing section 53 with an actual slide position signal FPT detected by the encoder 35 (feedback signal) and generates and outputs a position deviation signal ΔPT.

The position control section 62 generates and outputs a speed signal Sp by accumulating the inputted position deviation signal ΔPT and multiplying a position loop gain thereto. The speed comparator 63 compares the speed signal Sp and a speed signal (speed feedback signal) FS from the speed detector 36 and generates and outputs a speed deviation signal ΔS.

The speed control section 64 multiplies a speed loop gain to the inputted speed deviation signal ΔS and generates and outputs the current instruction signal Si to the current control section 71. Although the current instruction signal Si is substantially a torque signal St, since press load is not applied during the position and speed control, the current instruction signal Si is necessary only for increasing or reducing the revolution speed substantially under constant motor torque and therefore, the signal level is smaller than that in the case of controlling pressing force.

The control mode switching control section 37 compares the rotational angle θ of the crankshaft inputted from the encoder 35 with the pressing region (θ1 through θ2) and makes a changeover switch 38B ON (close) and makes a changeover switch 38A OFF (open) when the detecting angle θ is present in the working region (θ1 through θ2) and the slide is directed to a lowering direction. In other case, the control mode switching control section 37 outputs a switch signal CHG for making the changeover switch 38A ON (close) and making the changeover switch 38B OFF (open).

Further, the pressing region (θ1 through θ2) is set by using a rotational angle setter 55 described later in details and inputted to the control mode switching control section 37 via a slide pressing force pattern selector 57.

The motor drive control section 70 is constituted by the current control section 71 and a PWM control section (drive section) 72 and operates for position and speed control when switched to the position control system 60 (38A is made ON, 38B is made OFF) and operates for pressure control when switched to a pressing force control system (38A is made OFF, 38B is made ON).

Figure 4:
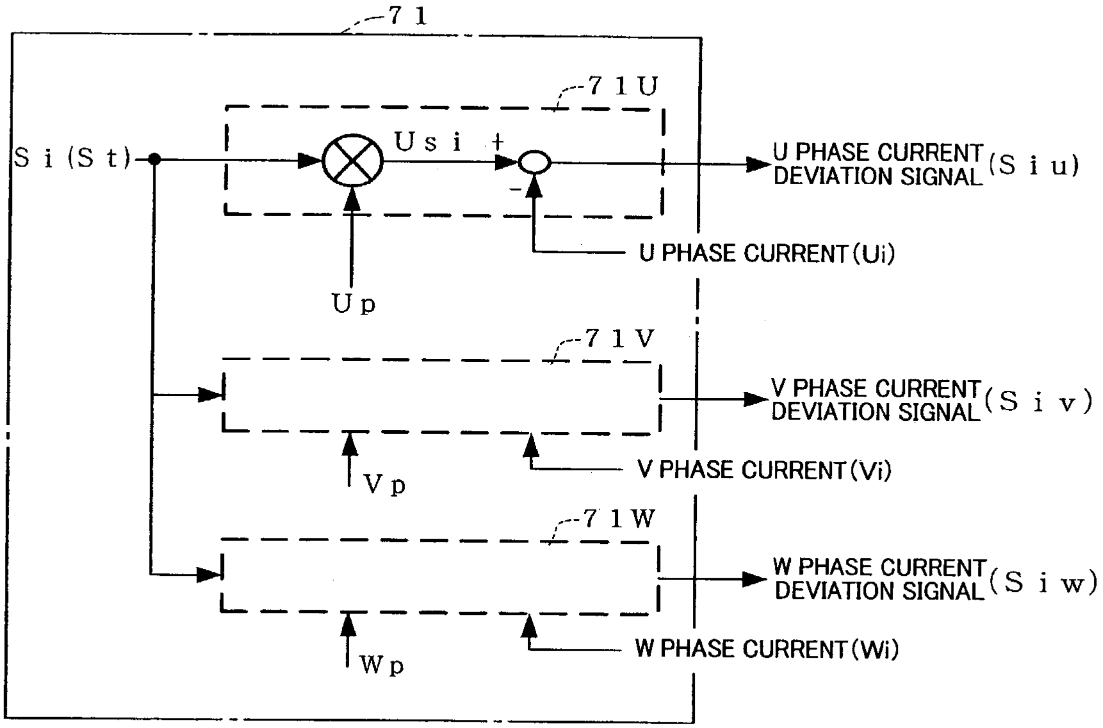
FIG. 4 is a view for explaining a current control section in FIG. 2.

As shown by FIG. 4, the current control section 71 comprises respective phase current control sections 71U, 71V, 71W. For example, the U phase current control section 71U generates a U phase target current signal Usi by multiplying a current instruction signal (corresponding to torque signal St) Si by a U phase signal Up and successively compares the U phase target current signal Usi and the actual U phase current signal Ui and generates to output a current deviation signal (U phase current deviation signal) Siu. Other V and W phase current control sections 71V, 71W generate to output V and W phase current deviation signals Siv and Siw.

The phase signals Up, Vp, Wp inputted to the current control section 71 are generated by a phase signal generating section 40 of FIG. 2. Notation 73 designates the phase motor current detector for detecting respective phase current (value) signals Ui, Vi, Wi to feed back to the current control section 71.

Figure 5A:
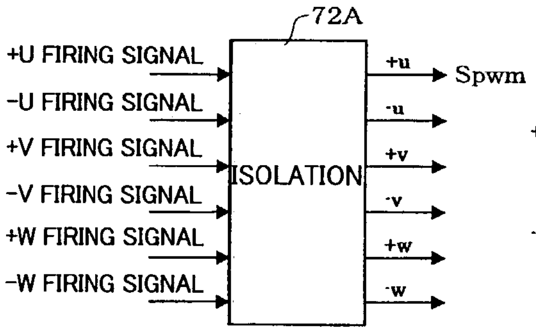
FIG. 5A and FIG. 5B are views for explaining a PWM control section (driver section) in FIG. 2.
Figure 5B:
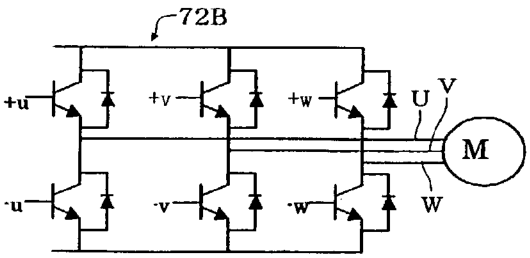
Figure 6A:
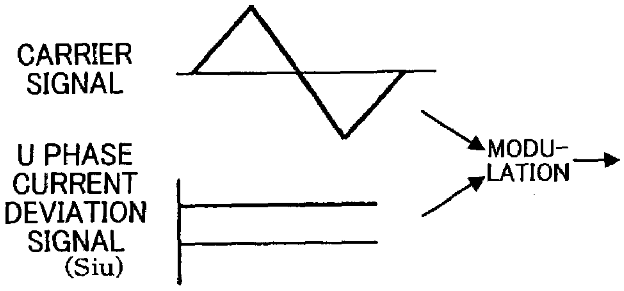
FIG. 6A and FIG. 6B are time charts for explaining operation of the PWM control section (driver section)
Figure 6B:
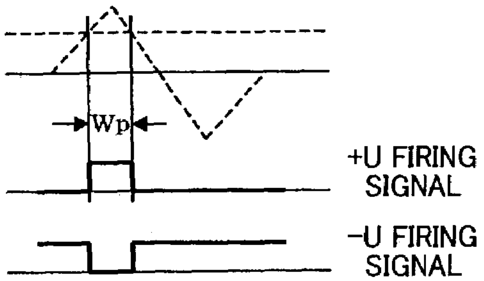

The PWM control section (driver section) 72 comprises a circuit (not illustrated) for carrying out pulse width modulation shown in FIGS. 6A, 6B, an isolation circuit 72A shown in FIG. 5A and a driver 72B shown in FIG. 5B.

That is, PWM signals Spwm are generated by subjecting the current phase signals Siu, Siv, Siw of respective phases outputted from the current control section 71 to PWM modulation.

A pulse signal width (Wp) of the PWM signal Spwm is determined by a time width Wp of a firing signal (+U firing signal or −U firing signal), the pulse signal width is long in the case of high load (for example, Siu is large current) and short in the case of low load.

The driver 72B comprises a switching circuit including respective pairs of transistors and diodes for the respective phases shown in FIG. 5B and can output respective phase motor drive currents U, V, W by being controlled to switch (ON/OFF) by respective PWM signals Spwm (for example, +U, −U).

In this way, the slide 17 can be moved down by controlling to drive to rotate the motor 30 regularly by the position control system (53, 60) when the slide position PT is determined to present between an initial position which can be changed to set (the same as the upper dead center position PT0 according to the embodiment) and a position for switching to the pressing region (θ1 through θ2) (PT1 through PT2) (θ1 . . . PT1) shown in FIG. 7.

Next, the setter 55 of the rotational angle (crank angle) of the crankshaft corresponding to a slide position setter, a slide pressing force setter 56, the slide pressing force pattern selector 57 and the slide pressing force instructing section 58 are included for pressing force control of the setting, selecting and instructing section 50. The setting, selecting and instructing section 50 is formed to be able to output the torque signal St in correspondence with the set slide pressing force signal PRS (motor torque value Ts) at the motor drive control section 70. The torque signal St corresponds to a signal for instructing the set and selected slide pressing force. The slide pressing force instructing section 58 is also the pressing force control system 58.

That is, the set slide pressing force signal PRs is formed to output as the torque signal St in correspondence therewith. The slide pressing force instructing section 58 operates for pressing force control along with the motor drive control section 70.

Figure 7:
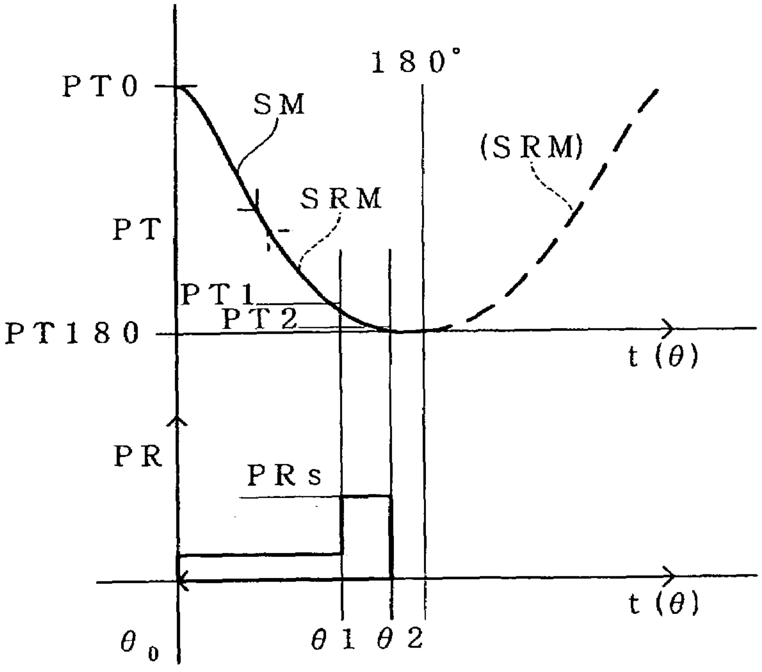
FIG. 7 is a time chart for explaining slide motion and constant formation of pressing force in pressing region.

The setter 55 of the rotational angle of the crankshaft corresponding to the slide position setter, sets the crankshaft angle θ and sets the pressing region (θ1 through θ2) by selecting and inputting the angle θ1 and the angle θ2 shown in FIG. 7. Further, the pressing region (PT1 through PT2) may be formed to be able to be set by selecting and inputting the slide positions PT1 and PT2. Further, any style or name may be used for the slide position setter or working region setter so far as the slide position setter or the working region setter can set the pressing region as a result.

The pressing force setter 56 sets slide pressing force (for example, PRs of FIG. 8A) in the set pressing region (θ1 through θ2).

The slide pressing force instructing section 58 outputs the slide pressing force signal PRs (motor torque value Ts) in correspondence with the rotational angle θ of the crankshaft detected by the encoder 35.

According to the embodiment, a target value signal outputted from the pressing force control system (slide pressing force instructing section 58) to the motor drive control section 70, is outputted based on the set slide force instructing pattern (pressing force PR (torque T)—angle θ or pressing force PR (torque T)—time t) and is constituted by the torque signal St in correspondence with the set signal (PRs) of the slide pressing force (PR) according to the embodiment.

In details, the pressing force control system (slide pressing force instructing section 58) is inputted with the torque signal (target value signal) St corresponding to the slide pressing force PR in correspondence with the crank angle θ at the corresponding time based on the pressing force instructing pattern (for example, relationship between crankshaft (rotational angle of crankshaft) θ and pressing force PR) of the slide 17 which is set previously or at the occasion.

Figure 8A:
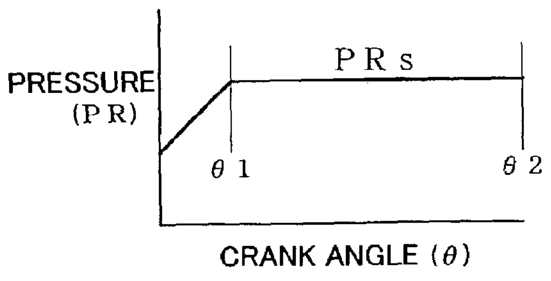
FIG. 8A and FIG. 8B are views for explaining an example of a mode of setting the pressing force in the pressing region.
Figure 8B:
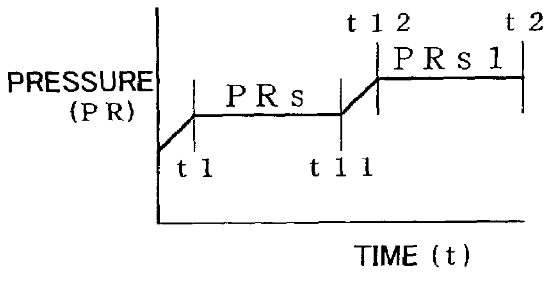

Therefore, since the pressing force instructing pattern can be integrated with one or two or more of pressing force in the pressing region, not only the single set slide pressing force signal PRs shown in FIG. 8A but, for example, two pressing forces (pressing force PRs and setting pressing force PRs1 higher than pressing force PRs) shown in FIG. 8B.

Figure 3:
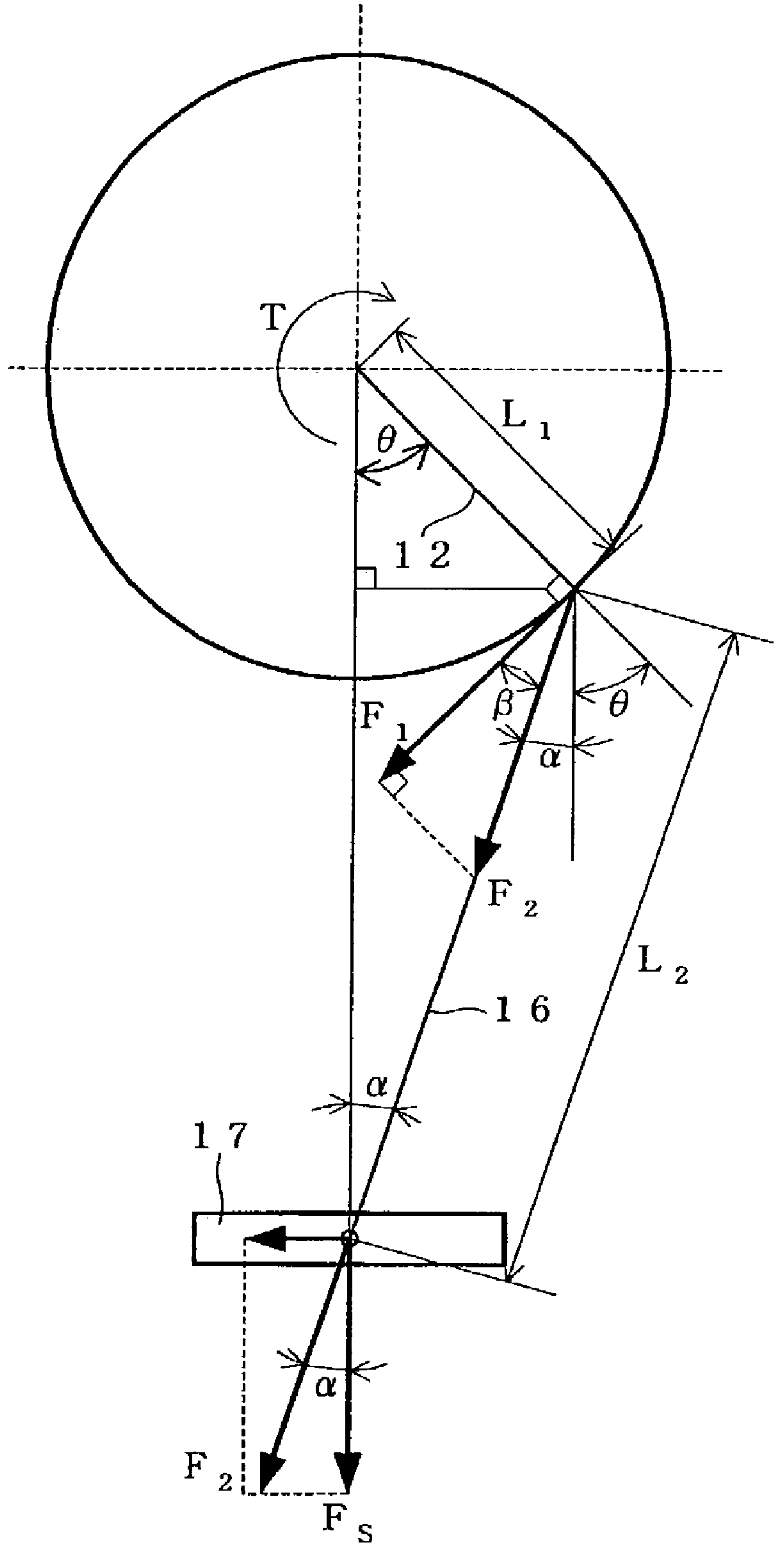
FIG. 3 is a view for explaining a relationship among torque T and rotational angle θ of a crankshaft and slide pressing force Fs.

An explanation will be given here of a relationship among the crank angle θ, the pressing force PR and the torque T in reference to FIG. 3. In FIG. 3, when the torque of the crankshaft 12 is designated by notation T, a crank radius is designated by notation L1, a length of the connecting rod 16 is designated by notation L2, a force in a crank rotating direction is designated by notation F1, a force in an axial direction of the connecting rod is designated by notation F2, the pressing force of the slide 17 is designated by notation Fs, an angle made by F2 and Fs is designated by notation a and an angle made by F1 and F2 is designated by notation β, the following equation is established.

$$F_s = \frac{1}{\sin\theta + L_2/L_1 \cdot \sin\theta\cos\theta \big/ \sqrt{\ }\{1-(L_1/L_2\cdot\sin\theta)^2\}} \cdot \frac{1}{L_1} \cdot T \qquad (1)$$

Therefore, in order to calculate the torque T at the corresponding time from the set pressing force Fs and the crank angle θ, the set motor torque value Ts (torque signal St) in correspondence with the set pressing force Fs can be outputted at the slide pressing force instructing section 58 by calculating the following equation.

$$T = \lfloor \sin\theta + L_2/L_1 \cdot \sin\theta\cos\theta \big/ \sqrt{\ }\{1-(L_1/L_2\cdot\sin\theta)^2\} \rfloor \cdot L_1 \cdot F_s \qquad (2)$$

Therefore, the accurate slide pressing force PR(Fs) (torque T) in accordance with the detected crank angle θ can swiftly be outputted.

Here, pressing force control and time control are conceivable for determining whether the slide is brought into the pressing region, determining a timing of switching a control mode and determining completion of forging in the pressing region. The pressing force control is carried out by controlling the pressing force PRi (motor torque. Ti) directly or controlling the angle (θi) or the slide position (PTi) indirectly in place thereof. On the other hand, the time control is carried out by controlling the elapsed time period (ti).

Figure 10:
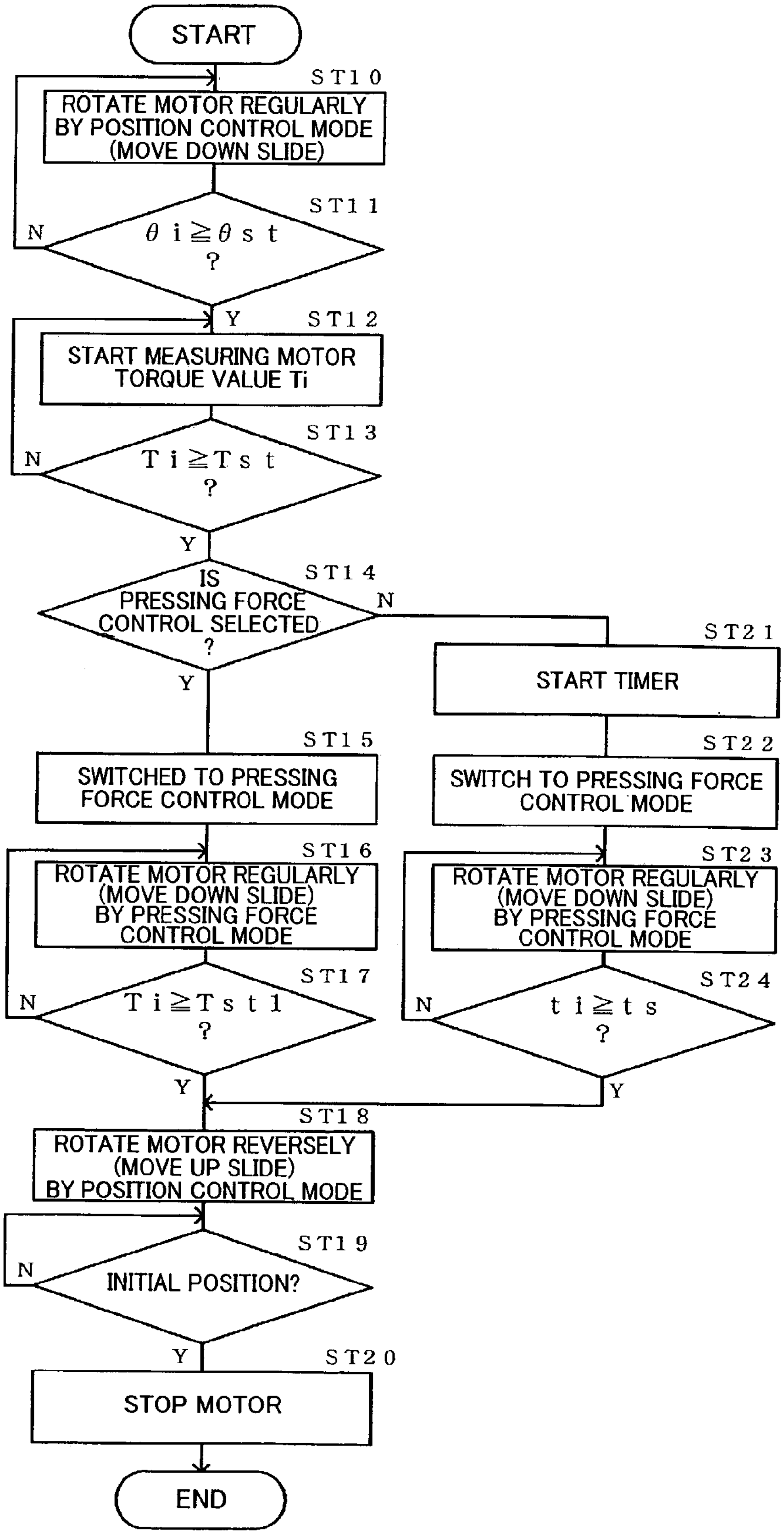
FIG. 10 is a flowchart for explaining a press operation.

According to the embodiment, although whether the slide is brought into the pressing region is determined by controlling the motor torque Ti (pressing force PRi), in determining the timing of switching the control mode and determining completion of forging in the pressing region, the motor torque Ti(pressing force PRi) control and the time control (ti) are constituted to be able to be selectively switched (refer to ST14 of FIG. 10). The pressing force control is preferable in forging, for example, a thick-walled material having a deep pattern, capable of producing a product reliably and provided with high safety. The time control is preferable in forging, for example, a thin-walled material having a shallow pattern, capable of producing a product reliably and simple to deal with.

In FIG. 10, when the rotational angle θi of the crankshaft 12 becomes equal to or larger than a previously set measurement start angle θst (for example, θst=θ1−β) in moving down the slide 17 by rotating the motor regularly in the position control mode (ST10) (YES at ST11), measurement of the motor torque is started (ST12). Further, when the measured torque (Ti) becomes equal to or larger than a set torque value Tst (equal to a motor torque value in correspondence with the slide pressing force PRs set in FIG. 8 according to the embodiment) (YES at ST13), it is determined that the slide is brought into the pressing region.

When the pressing force control is selected (YES at ST14), the control mode switching control section 37 outputs the switch signal CHG immediately, the changeover switch 38A of FIG. 2 is made OFF, the changeover switch 38B is made ON to thereby switch to the pressing force control system (slide pressing force instructing section 58) (ST15). When the time control is selected (NO at ST14), a timer (not illustrated) for counting the elapsed time period ti is started (ST21) and thereafter, the operation is switched to the pressing force control system (slide pressing force instructing section 58) (ST22).

In either of the cases, when the slide position PT is present in the pressing region PT1 through PT2, pressing can be carried out by moving down the slide 17 by controlling to drive to rotate the motor 30 regularly by the pressing force control system (slide pressing force instructing section 58) switched from the position control system 60 (ST16, ST23). According to the embodiment, the slide position PT corresponds to the rotational angle θ of the crankshaft. Further, the pressing region PT1 through PT2 correspond to θ1 through θ2 according to the embodiment.

Finish of forging (pressing) in the pressing region is determined by whether the motor torque Ti becomes equal to or larger than a set working finish torque value Tst1 in the case of the pressing force control (ST17) and determined whether the measured elapsed time period ti becomes equal to or larger than a set working finish time period ts in the case of the time control (ST24). Therefore, even in the case of pressing under constant pressing force, with finish of the working, the slide 17 is reversely moved swiftly and firmly (moved up without passing the bottom dead center) (ST18). The same goes with the case of monitoring and determining by the crank angle (θ).

In details, after completion of pressing and after reaching a position before the bottom dead center (P180−α) before the slide position PT reaches the bottom dead center position (P180 of FIG. 7) the motor 30 is stopped (ST20) when the slide 17 is moved up to return to an initial position (PT0) (YES at ST19) while moving up the slide 17 by controlling to drive to rotate the motor 30 reversely by the switched position control system 60 by making the changeover switch 38A of FIG. 2 ON, making the change over switch 38B OFF by outputting the switching signal CHG and switching the pressing force control system (slide pressing force instructing section 58) to the position control system 60 again (ST18) by the control mode switching control section 37.

In the press machine 10 according to the first embodiment, the drive control power source of the press operation drive control section is made ON in a state of stopping the press operation in which the crankshaft 12 is stopped at the top dead center position (PT0) of FIG. 7.

Then, since the crank rotational angle θ detected by the encoder 35 is present in a region other than the pressing region (θ1 through θ2), the control mode switching control section 37 makes the changeover switch 38A of FIG. 2 ON (close) by outputting the switch signal CHG and makes the changeover switch 38B OFF (close) by outputting the switch signal CHG. That is, the control mode is switched to the position (speed) control mode (ST10 of FIG. 10).

Here, when a press operation instruction is issued, a set slide position signal (position pulse) PTs set based on a selected motion pattern (t-PT curve) is outputted (issued) from the motion instructing section 53.

Therefore, the position control system 60 forming the position control system 60 and the motor drive control section 70 are operated, and the motor 30 is rotated regularly (for example, leftwardly) by the respective phase motor drive currents U, V, W. The slide moves down via the crankshaft 12 and the connecting rod 16 shown in FIG. 1 (ST10 of FIG. 10).

The slide lowering speed at the occasion is in conformity with a motion SM (curve) based on the selected slide motion pattern shown in FIG. 7. When "automatic" is set by the speed setter 51, the slide is moved down at highest speed.

In the case of selecting the pressing force control (YES at ST14 of FIG. 10), when the motor torque Ti is determined to be equal to or larger than the set torque value Tst (YES at ST13), the control mode switching control section 37 switches the mode to the pressing force control system (slide pressing force instructing section 58) by making the changeover switch 38B ON (close) and making the changeover switch 38A OFF (open) by outputting the switch signal CHG (ST15). The case of determining that the motor torque Ti becomes equal to or larger than the set torque value Tst (YES at ST13) is the case of determining that the slide is brought into the selected pressing region (θ1 through θ2).

Further, when the control is selected (YES at ST14), the timer is started (the elapsed time period Ti starts counting) (ST21).

As shown by FIG. 8B, the time control is necessary when completion of forging (pressing) is determined by the time control (t1 through t2). Although the timer per se (not illustrated) is provided in the control mode switching control section 37, the timer may be provided in the press operation drive control section.

In the case of the pressing force control (or crank angle control shown in FIGS. 8A and 8B) in place of the time control, the timer as well as step ST12 of FIG. 10 are not necessary.

Here, the motor drive control section 70 is inputted with the set slide pressing force signal PRs, that is, the motor torque instruction (St) in correspondence therewith from the slide pressing force instructing section 58 and therefore, the slide is moved down while controlling the motor 30 to make the pressing force constant such that the actual slide pressing force constantly becomes the slide pressing force (set slide pressing force signal PRs) (ST16). The same goes with the case of step ST23.

Since the pressing force is controlled to be constant, an influence of an error in a thickness of a work (material) is not effected. For example, in the case of a material (work) in correspondence with a coin (work), even when there is a dispersion in the material before forming, the same pattern can be formed in all of the material (work) in correspondence with a coin (work) by the same depth and the same width. The same goes with a case of a helical gear.

That is, the forging can stably be carried out safely and a high quality product (helical gear, material in correspondence with coin) can be reliably produced. Further, due to the pressing force control, pressing can be carried out by rotating the motor 30 at ultra low speed. Further, maximum torque can be produced from null of the rotational speed and therefore, broad adaptability is achieved.

Further, in the case of the pressing force control, completion of forging is determined when the motor torque Ti becomes equal to or larger than the set working finish torque value Tst1 (YES at ST17). In the case of the time control (time monitoring), completion of forging is determined when the measured elapsed time period Ti by the timer becomes equal to or longer than the set working finish time period ts (YES at ST24). That is, after pressing has been completed and after the slide position PT(θ) has reached a position before the bottom dead center position (P180−α), the control system is switched from the pressing force control system (slide pressing force instructing section 58) to the position control system 60 again. The position control system 60 after switching returns the slide 17 to move up to the initial position (Pt0) in accordance with a curve SRM of FIG. 7 by controlling to drive to rotate the motor 30 reversely (ST18). When the slide returns to the initial section (PT0), the motor 30 is stopped (YES at ST19, ST20). The curve SRM of FIG. 7 is equal to a curve produced by inverting the curve shown by a dotted line on the right side of the curve SM (angle θ (180°)) to a left side thereof.

Further, the pressing can be carried out by setting the initial position not to the top dead center position (PT0 . . . θ0) but to an arbitrary angle (for example, θ0+α).

That is, after completing the press operation and after reaching the position before the bottom dead center, the control system is switched to the position control system again and the slide 17 is moved up without passing the bottom dead center and therefore, it is not necessary to move the slide up and down in a unnecessary movable stroke. That is, production tact time can be shortened.

Second Embodiment

According to the second embodiment, although a basic constitution thereof is made similar to that in the case of the first embodiment (FIG. 1 through FIGS. 5A and 5B), the speed setter 51, the angle setter 55 and the pressure setter 56 in FIG. 2 are formed by an operation panel 85 constituting a section of the computer 80 shown in FIG. 9. Further, the motion pattern selector 52, the motion instruction section 53, the slide pressing force pattern selector 57 and the slide pressing force instructing section 58 in FIG. 2 are formed by the operation panel 85, CPU 81, ROM 82 and RAM 83.

That is, as shown by FIG. 9, the computer 80 includes CPU 81, ROM 82, RAM 83, an oscillator (OSC) 84, the operation panel (PNL) 85, a display section (IND) 86 and an interface (I/F) or (input/output port (I/O)) 87 to thereby constitute the setting, selecting and instructing section 50.

An input/output apparatus 100 connected to the interface (I/F) or (input/output port (I/O)) 87 indicates a generally referred concept including the position control system 60 and the motor drive control section 70 as described above.

Further, although in the following, an explanation will be given such that various fixed information, control programs, operation (calculating) equations are fixedly stored to ROM 82, these may be formed to be stored to a rewritable flash memory or a hard disk device (HDD).

At any rate, by only exchanging storage related information (for example, data table), a variety of slide pressing forces can be utilized and therefore, adaptability to a pressing mode or the like can further be enlarged in comparison with the case of the first embodiment.

The motion pattern selector 52 outputs single storage related information (selected motion pattern) selected by operating a key of the operation panel 85 from a plurality of slide motion patterns (information of relationship corresponding the crank angle θ and the slide position PT) previously stored in ROM 82 and displayed on the display section 86 to the motion instructing section (CPU 81, ROM 82, RAM 83).

As the motion instructing section 53, CPU 81 outputs the position pulse (PTs) at a timing (5 mS) similar to the timing in the case of the first embodiment based on control programs stored to ROM 82 and storage related information (selected motion pattern) which is inputted (temporarily stored to RAM 83).

As the slide press pattern selector 57, single storage related information (selected slide pressing force pattern) selected by operating a key of the operation panel 85 from a plurality of slide pressing force patterns (related information corresponding the crank angle θ and the slide pressing force PR) previously stored to ROM 82 and displayed on the display section 86, is outputted to the slide pressing force instructing section (CPU 81, ROM 82, RAM 83).

As the slide pressing force instructing section 58, CPU 81 outputs the torque signal Ts in correspondence with the pressing force pulse at a timing (5 mS) similar to timing in the case of the first embodiment based on control programs stored to ROM 82 and storage related information (selected slide pressing force) which is inputted (temporary stored to RAM 83).

Further, on the basis of a clock pulse of the oscillator 84, a timing for issuing control is determined and a timer (CPU 81, ROM 82) is also constructed to be able to count the elapsed time period Ti.

By the press machine according to the first embodiment of the invention, the following excellent effect can be achieved.

Forging can stably be carried out and a high quality product (helical gear, etc.) can be reliably produced.

Influence of an error in a thickness of a work (material) is not effected.

Owing to the pressing force control, pressing can be carried out at ultra low speed revolution. Further, broad adaptability is achieved since maximum torque can be produced from null of the revolution speed.

Production tact time can considerably be shortened since the slide is only moved up and down by the press operation stroke between the set position (top dead center and the like) and the position before the bottom dead center, that is, between the initial position and the pressing finish position.

Third Embodiment

As shown by FIG. 11 through FIG. 21, the press machine 110 is constituted to be able to drive to rotate by controlling to rotate a motor 130 connected to a crankshaft 112 and to be able to detect drive current I of the motor 130. The press machine 110 is provided with a pressing force adjusting mechanism 220 constituted to be able to control to extract and detract a relative distance between the crankshaft 112 and a slide 117 in an up-and-down direction by a control signal UD in an unlocked state. Further, the pressing force adjusting mechanism 220 of the press machine 110 is constituted to be able to hold the relative distance in the up-and-down direction after finishing increasing or decreasing the relative distance so as to be adjusted by the control signal as it is in a locked state. The press machine 110 includes pressing force calculating sections (181, 182) for calculating pressing force PR of the slide 117 by utilizing a rotational angle θ of the crankshaft detected before a bottom dead center position (θ1 through bottom dead center position (180°) . . . a vicinity of bottom dead center position) and motor drive current I. Further, the press machine 110 includes pressing force determining sections (181, 182) for comparing the calculated slide pressing force PR and previously set pressing force PRs and determining whether the calculated pressing force is larger than the set pressing force. The press machine 110 is provided with control signal output sections (181, 182) for generating the control signal UD for moving up the slide when the calculated pressing force PR is determined to be larger than the set pressing force PRs and moves down the slide when the calculated pressing force PR is smaller than the set pressing force PRs and outputting the control signal to the pressing force adjusting mechanism 220. The press machine 110 is constituted to be able to hold the slide pressing force PR to the desired pressing force (PRs) at a vicinity of the bottom dead center position (finish end section of pressing region).

Further, the third embodiment is provided with temporarily stop control sections (181, 182), state switching control sections (181, 182) and slide redrive control sections (181, 182), and constituted to be able to automatically control slide pressing force in a state of temporarily stopping the slide at a set point position.

Figure 11:
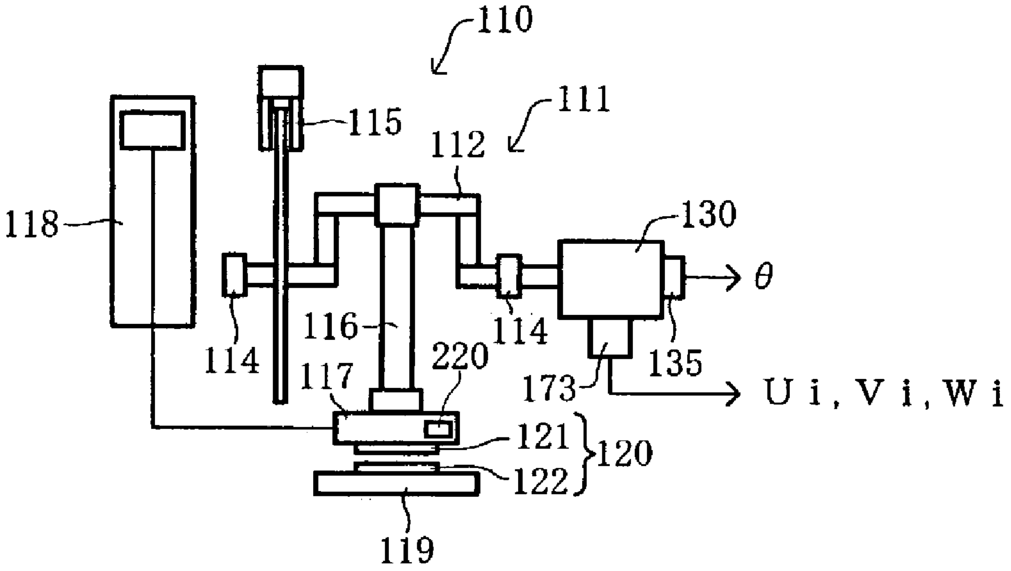
FIG. 11 is an outline view for explaining a press machine according to a third embodiment of the invention.

In FIG. 11, the drive mechanism of the press machine 110 is constituted by a crank mechanism 111 including the crankshaft 112 and the like. The crankshaft 112 is rotatably supported by bearings 114 and can be controlled to drive to rotate by controlling to rotate the motor 130 comprising an AC (alternating current) servo motor directly connected thereto. Alternatively, motor 130 may be a DC (direct current) servo motor or a reactance motor. Notation 115 designates a mechanical brake.

Further, the crankshaft 112 and the motor 130 may indirectly be connected via a gear (speed reducer). When the gear (speed reducer) is interposed, higher pressing force can be achieved.

The slide 117 is mounted to a frame main body (not illustrated) slidably in an up-and-down direction and slidably engaged with a weight balance apparatus 118. Therefore, when the crankshaft 112 is driven to rotate, the slide 117 the weight of which is balanced via a connecting rod 116 can be driven to move up and down. A die 120 comprises an upper die 121 attached to a side of the slide 117 and a lower die 122 attached to a side of a bolster 119. According to the embodiment, there is constituted a structure of the die 120 for drawing (pressing).

In this case, the connecting rod 116 and the slide 117 of the press machine 110 are connected via the pressing force adjusting mechanism 220 of a suspension point structure type. Although according to the pressing force adjusting mechanism 220, a ball type and a wrist pin type are conceivable in gross classification, according to the embodiment, the ball type is adopted since the ball type is provided with advantages of small size, low cost and small play.

Figure 13:
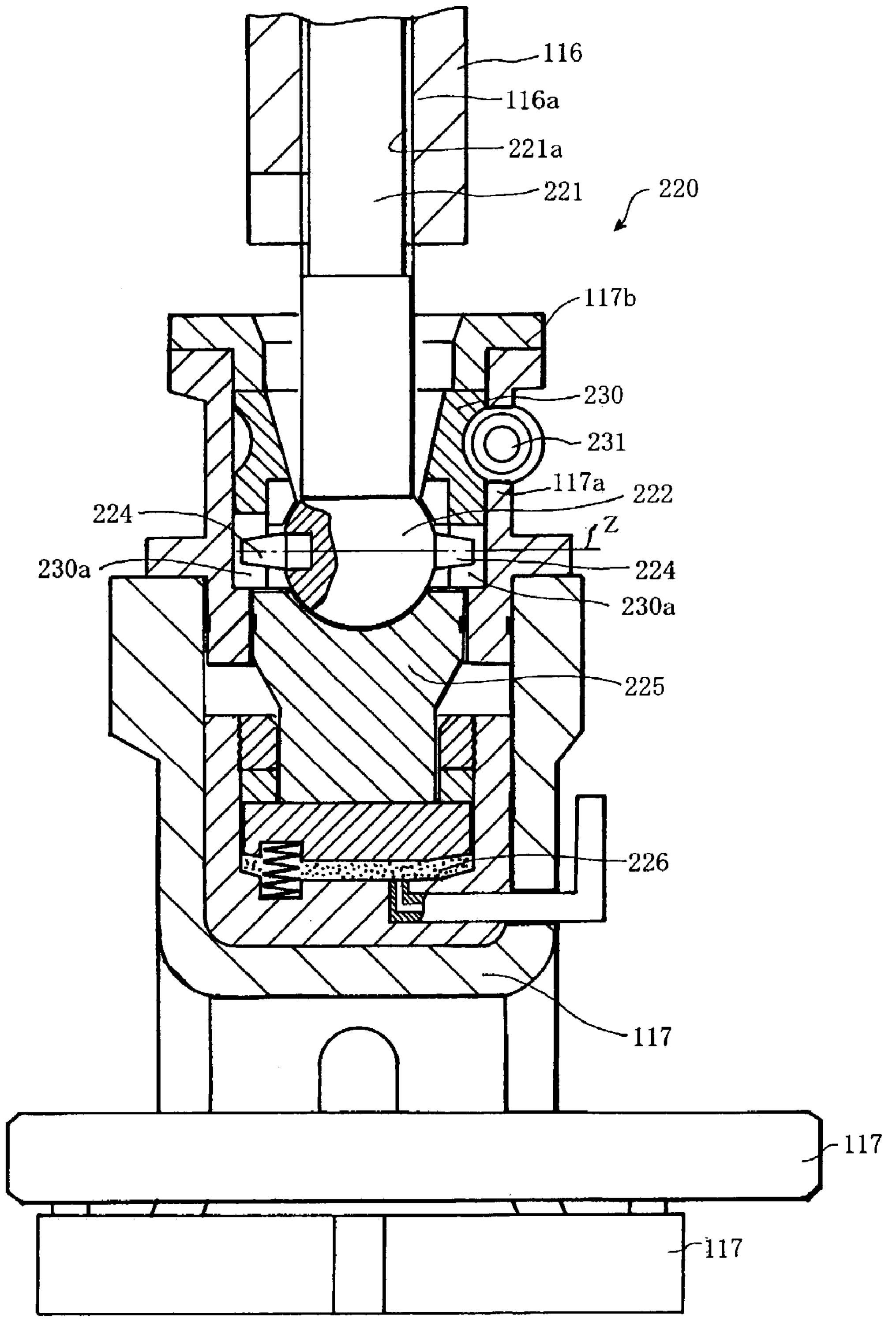
FIG. 13 is a vertical sectional view for explaining a pressing force adjusting mechanism.
Figure 19:
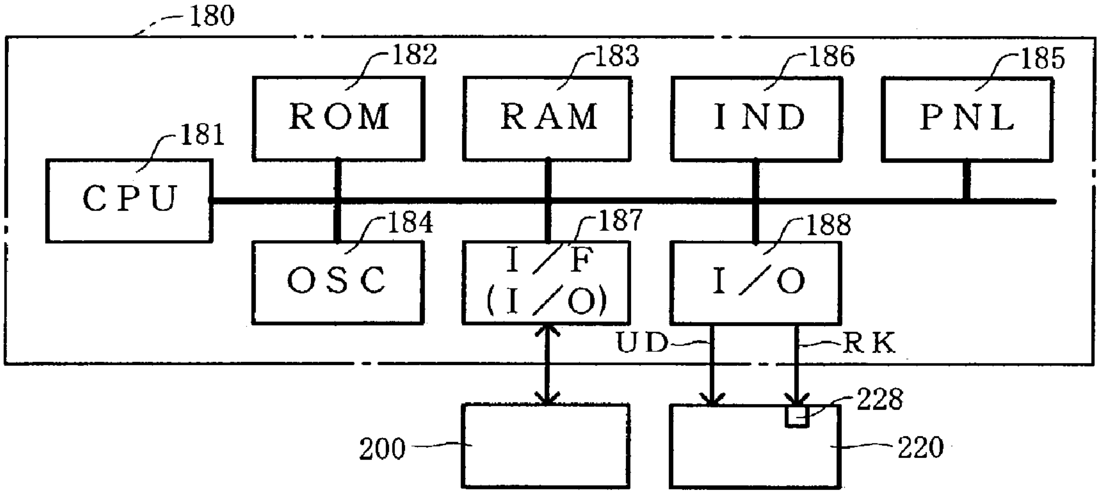
FIG. 19 is a block diagram for explaining a control section.

In FIG. 13, the pressing force adjusting mechanism 220 is constituted to be able to control to extract and detract the relative distance between the crankshaft 112 and the slide 117 by the control signal UD of FIG. 19 in the unlocked state and to be able to hold the relative distance in the up-and-down direction after finishing increasing or decreasing the relative distance so as to be adjusted by the control signal UD as it is in the locked state.

In details, in FIG. 13, the connecting rod 116 (screw 116*a*) and a control screw shaft 221 are screwed together (engaged) and a ball 222 is fixedly attached to a lower end section of the control screw shaft 221.

Meanwhile, a ball cup 225 is attached to the slide 117 slidably guided by a column or the like movably in the up-and-down direction. Further, notation 117*a* designates a cylindrical member integral with the slide 117 for containing a worm wheel 230, notation 117*b* designates a slide constituent element for transmitting up and down movement of the ball 222 to the slide 117 and the notation 226 designates a hydraulic chamber constituting an overload safety apparatus.

The connecting rod 116 and the slide 117 are connected via a spherical bearing structure, that is, a point structure formed by the ball 222 and the ball cup 225 and therefore, by sliding movement of the connecting rod 116, the slide 117 can be moved linearly in the up-and-down direction.

Further, the cylindrical member 117*a* of the slide 117 is mounted with the worm wheel 230 rotated by a worm screw 231, meanwhile, the ball 122 is attached with a pin 224 extended in a diameter direction and the pin 124 is inserted into a vertical groove 230*a* of the worm wheel 230 to thereby connect the both members 222 and 230 rotatably in synchronism with each other.

Therefore, when the worm screw 231 is rotated automatically or manually in the unlocked state, the worm wheel 230 is rotated. The rotation is transmitted to the ball 222, that is, the control screw shaft 221 via the pin 224. Then, the connecting rod 116 (female screw 116*a*) and the control screw shaft 221 (male screw 221*a*) are rotated relative to each other and therefore, the slide 117 can be moved in the up-and-down direction relative to the connecting rod 116 connected to the crankshaft 112. Thereby, large or small of slide pressing force can be controlled.

Thereafter, when the crankshaft 112 is rotated, the connecting rod 116 is moved to be swung centering on the ball 222, thereby, the slide 117 is made to be stroked in the up-and-down direction and a predetermined product can be pressed by controlled pressing force.

Further, the pressing force adjusting mechanism 220 is integrally assembled with a state switching apparatus 228 (refer to FIG. 19) although illustration thereof is omitted in FIG. 13. That is, in a normal mode (when a lock release signal RK is not outputted), the worm wheel 230 is brought into a locked state of being restrained unpivotably by spring force. Further, when the lock release signal RK of FIG. 19 is outputted, the state switching apparatus 228 is operated (hydraulic pressure is supplied) and the pressing force adjusting mechanism 220 can forcibly be switched to an unlocked state against the spring force by supplied hydraulic pressure.

Figure 12:
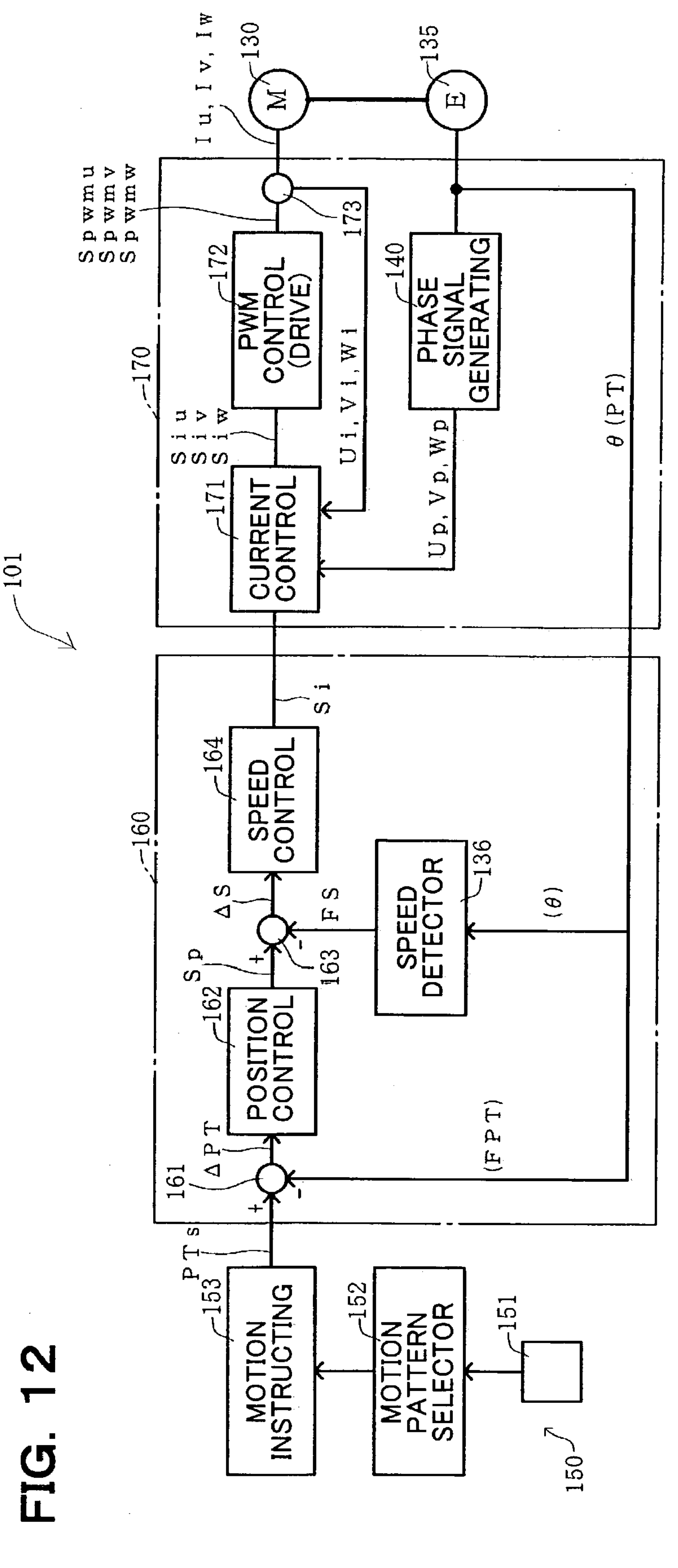
FIG. 12 is a block diagram for explaining a control section (setting, selecting and instructing section, position control system, pressing force control system) of the press machine shown in FIG. 11.

Further, the motor 130 shown in FIG. 11 and FIG. 12 is an AC servo motor. Respective phase current signals Ui, Vi, Wi in correspondence with respective phase motor drive currents Iu, Iv, Iw of the motor 130 are detected by a current detector 173. Further, the motor 130 is connected with an encoder 135.

The encoder 135 includes a number of optical slits and an optical detector in principle and outputs a rotational angle (crank angle) θ of the motor 130 (crankshaft 112). According to the embodiment, a signal converter (not illustrated) for converting the rotational angle θ (pulse signal) to a vertical position PT (pulse signal) of the slide 117 to output is included.

In FIG. 12, a control section 101 is constituted by a setting, selecting and instructing section 150, a position control system 160 and a motor drive control section 170.

Figure 20:
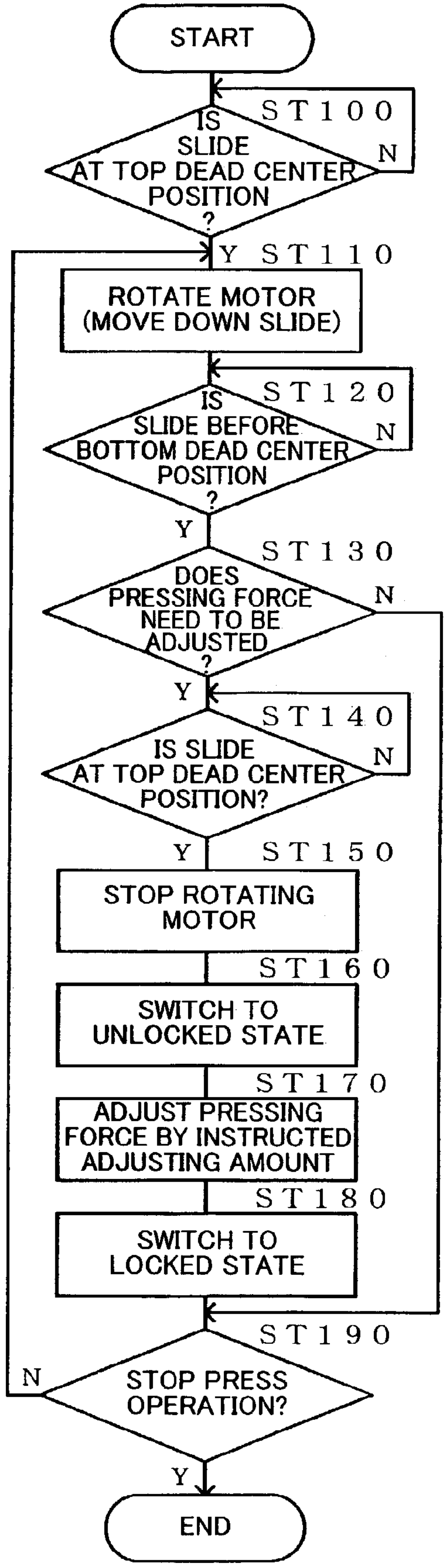
FIG. 20 is a flowchart for explaining a press operation.
Figure 21:
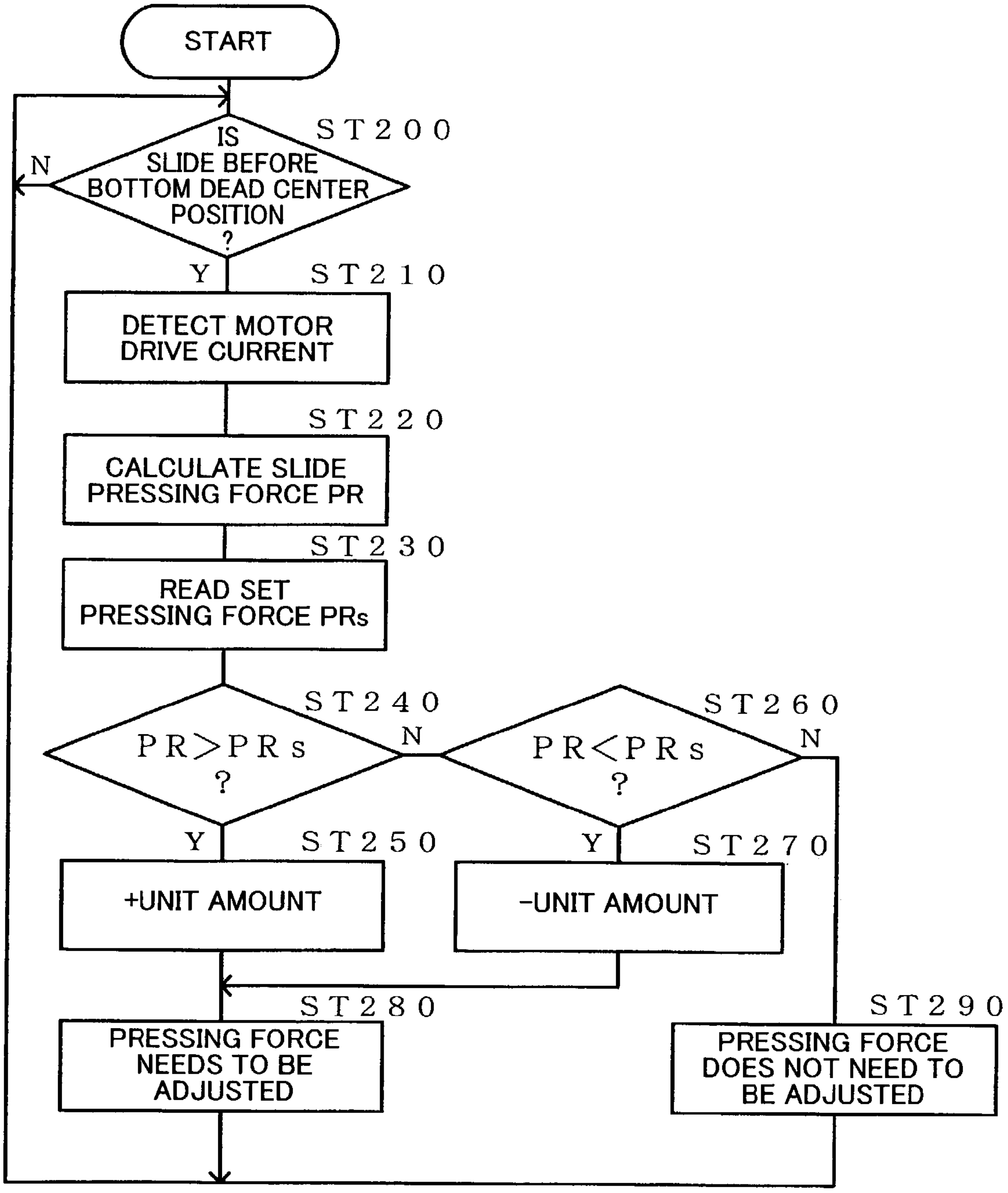
FIG. 21 is a flowchart for explaining a press operation.

Further, there is provided a press operation drive control section (computer 180) connected to these (150, 160, 170, etc.) and necessary for a specific press operation. Representative operation of the press operation drive control section (computer 180) shown in FIG. 19 is as shown by FIG. 20 and FIG. 21.

In FIG. 19, the computer 180 for constituting the press operation drive control section includes CPU 181, ROM 182, RAM 183, an oscillator (OSC) 184, an operation panel (PNL) 185, a display section (IND) 186, an interface (I/F) (or input and output ports (I/O)) 187 and input and output ports (I/O) 188 for governing driving control of a total press machine.

An input/output apparatus 200 connected to the interface (I/F) (or input/output ports (I/O)) 187 is a generally referred concept including the position control system 160, the motor drive control section 170 and the like as described above.

The input/output port (I/O) 188 is connected with the pressing force adjusting mechanism 220 and the state switching apparatus 228 having a function of switching the pressing force adjusting mechanism 220 selectively to either of the locked state and the unlocked state.

Further, although in the following, an explanation will be given such that various fixed information, control programs, operation (calculating) equations are fixedly stored to ROM 182, these may be constituted to store to a rewritable flash memory, a hard disk device (HDD) or the like.

The setting, selecting and instruction section 150 includes a speed setter 151, a motion pattern selector 152 and a motion instructing section 153 and is constituted to be able to output a set slide position signal (set selected motion instructing signal) PTs to the position control system 160.

The speed setter 151 shown in FIG. 12 is formed by the operation panel 185 constituting a section of the computer 180 shown in FIG. 19 and the motion pattern selector 152 and the motion instructing section 153 are formed by the operation panel 185, CPU 181, ROM 182 and RAM 183 shown in FIG. 19.

Although the speed setter 151 can set the rotational speed (for example, 100 RPM) of the motor 130 by "manual", when "automatic" is selected, the speed setter 151 is dealt with as selecting previously selected and set maximum rotational speed. The speed setter 151 may be formed by an SPM setter, a production speed setter or the like.

The motion pattern selector 152 outputs single storage related information (selected motion pattern) selected by operating a key of the operation panel 185 from a plurality of slide motion patterns previously stored to ROM 182 and displayed on the display section 186 to motion instructing sections (CPU 181, ROM 182, RAM 183). The slide motion pattern is constituted by information of a relationship corresponding an elapsed time period t from start of operation in correspondence with the crank angle θ to the slide position PT (t-PT curve).

The selected motion pattern (t-PT curve) is outputted to the motion instructing section 153 along with motor revolution speed (or slide speed (so-to-speak slide stroke number SPM)) set by using the speed setter 151.

Further, the motion pattern selector 152 may be constituted to be able to form (or select) the motion pattern (t-PT curve) by correspondingly inputting the respective crank angle θ and the respective slide position PT at the occasion.

As the motion instruction section 153, CPU 181 outputs the position pulse (PTs) at a predetermining timing (5 mS) based on control programs stored to ROM 182 and the storage related information (selected motion pattern, set speed and the like) which is inputted (temporarily stored to RAM 83).

The motion instructing section 153 is constituted by a structure of a type of issuing the position pulse for outputting the set slide position signal PTs in compliance with the selected motion pattern (t-PT curve).

For example, when the motor revolution speed set by the speed setter 151 is 120 RPM, the number of pulses outputted per rotation (360 degrees) from the encoder 135 is a million pulses and issuing cycle time is 5 mS, the number of pulses outputted at every cycle (5 mS) becomes 10,000 pulses (=(1,000,000×120/60)×0.005).

Further, depending on the set motor revolution speed or a magnitude of load, as a measure for preventing rapid change in speed (position), it is preferable to provide an accelerating section (for successively increasing the number of output pulses) immediately after starting and a decelerating section (for successively reducing the number of output pulses) when the slide is brought into the pressing region or immediately before stopping the press operation.

Further, in either cases of setting of the rotational speed by "manual" and "automatic", the rotational speed when the slide is brought into the pressing region can be set to be low speed decelerated from rotational speed therebefore.

A target value signal to the position control system 160 in position control is understood as the slide position corresponding signal (PTs) outputted based on a motion instruction pattern (motion curve SM) shown in FIG. 18. That is, the position control system 160 is inputted with a signal (target value signal) corresponding to the slide position (PT) in correspondence with the crank angle θ at the corresponding time based on the motion instructing pattern of the slide 117 which is set previously or at the occasion.

The motion instructing pattern of the slide 117 can be inputted with information of scheming to alleviate impact force of the slide when the slide is brought into the pressing region and minimizing a slide moving up and down (one reciprocation) time period at other region excluding the pressing region (maximizing speed).

The motor revolution speed set by using the speed setter 151 is reflected to the motion instructing pattern (t-PT curve). Thereby, productivity can further be promoted while achieving a reduction in impact and noise in pressing.

Further, the press operation drive control section (180) can also be constructed by using a sequencer, logic circuit or the like.

At any rate, by only exchanging storage related information (for example, data table), a variety of slide motions can be utilized and therefore, adaptability to a pressing mode or the like can further be enlarged.

In this case, the position control system 160 includes the motion instruction section 153, a position comparator 161, a position control section 162, a speed comparator 163 and a speed control section 164 and is constituted to output a torque signal St to a current control section 171. Further, a speed detector 136 is expressed in the form of being included in the position control system 160 for convenience of illustration. Further, the motion instruction section 153 is expressed in the form of not being included in the position control system 160 for convenience of illustration.

First, the position comparator 161 compares the set slide position signal PTs which is a target value signal from the motion instructing section 153 with an actual slide position signal FPT (feedback signal) detected by the encoder 135 and generates to output a position deviation signal APT.

The position control section 162 accumulates the inputted position deviation signal ΔPT, multiplies a position loop gain thereto and generates to output a speed signal Sp. The speed comparator 163 compares the speed signal Sp and a speed signal (speed feedback signal) FS from the speed detector 136 and generates to output a speed deviation signal ΔS.

The speed control section 164 multiplies the inputted speed deviation signal ΔS by a speed loop gain and generates to output a current instructing signal Si to the current control section 171. Although the current instructing signal Si is substantially the torque signal, since press load is not applied during the position (speed) control, the current instruction signal is necessary only for increasing or reducing the rotational speed under substantially constant motor torque and therefore, the signal level is small.

The motor drive control section 170 is constituted by the current control section 171 and a PWM control section (drive section) 172.

Figure 16A:
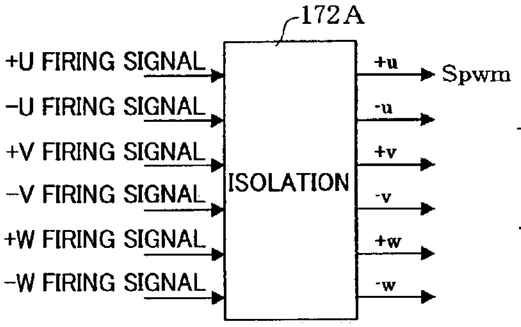
FIG. 16A and FIG. 16B are views for explaining a PWM control section (drive section)
Figure 16B:
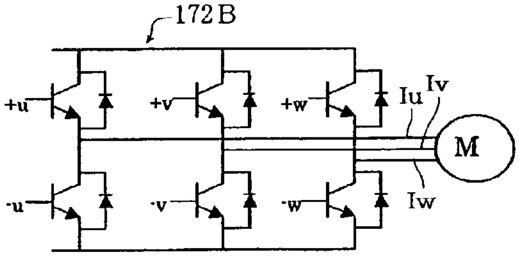

As shown by FIGS. 16A and 16B, the current control section 171 is constituted by respective phase current control sections 171U, 171V and 171W. For example, the U phase current control section 171U generates a U phase target current signal Usi by multiplying the current instructing signal (corresponding to torque signal St) Si by a U phase signal Up and successively compares the U phase target current signal Usi and the actual U phase current signal Ui and generates to output a current deviation signal (U phase current deviation signal) Siu. In other V and W phase current control sections 171V and 171W, V and W phase current deviation signals Siv and Siw are generated to output.

The phase signals Up, Vp, Wp inputted to the current control section 171 are generated by a phase signal generating section 140 of FIG. 12. Notation 173 designates the phase motor current detector for detecting the respective phase current (value) signals Ui, Vi, Wi to feed back to the current control section 171.

The PWM control section (drive section) 172 comprises a circuit (not illustrated) for carrying out pulse width modulation shown in FIGS. 17A and 17B, an isolation circuit 172A shown in FIG. 16A and a driver 172B shown in FIG. 16B.

That is, PWM signals Spwmu, Spwumv, Spwmw are generated from current deviation signals Siu, Siv, Siw of respective phases outputted from the current control section 171.

A pulse signal width (Wp) of the PWM signal Spwm is determined by a time width Wp of a firing signal (+U firing signal or −U firing signal), and is long in the case of high load (for example, Siu is large current) and short in the case of low load.

The driver 172B comprises a switching circuit including respective pairs of transistors and diodes for respective phases shown in FIG. 16B and controlled by switching (ON/OFF) by the respective PWM signals Spwm (for example, +U, −U) and can output the respective motor drive currents Iu, Iv, Iw.

Here, the pressing force calculating sections (CPU 181, ROM 182) calculate slide pressing force PR by utilizing the rotational angle θ detected by the encoder 135 and motor drive current I ((|Iu|+|Iv|+|Iw|)/3) detected by using the phase motor current detector 173 (ST210) at a position before (at a vicinity of) the bottom dead center (YES at ST200 of FIG. 21) and constants (L1, L2) and based on storage related information (ST220).

Figure 14:
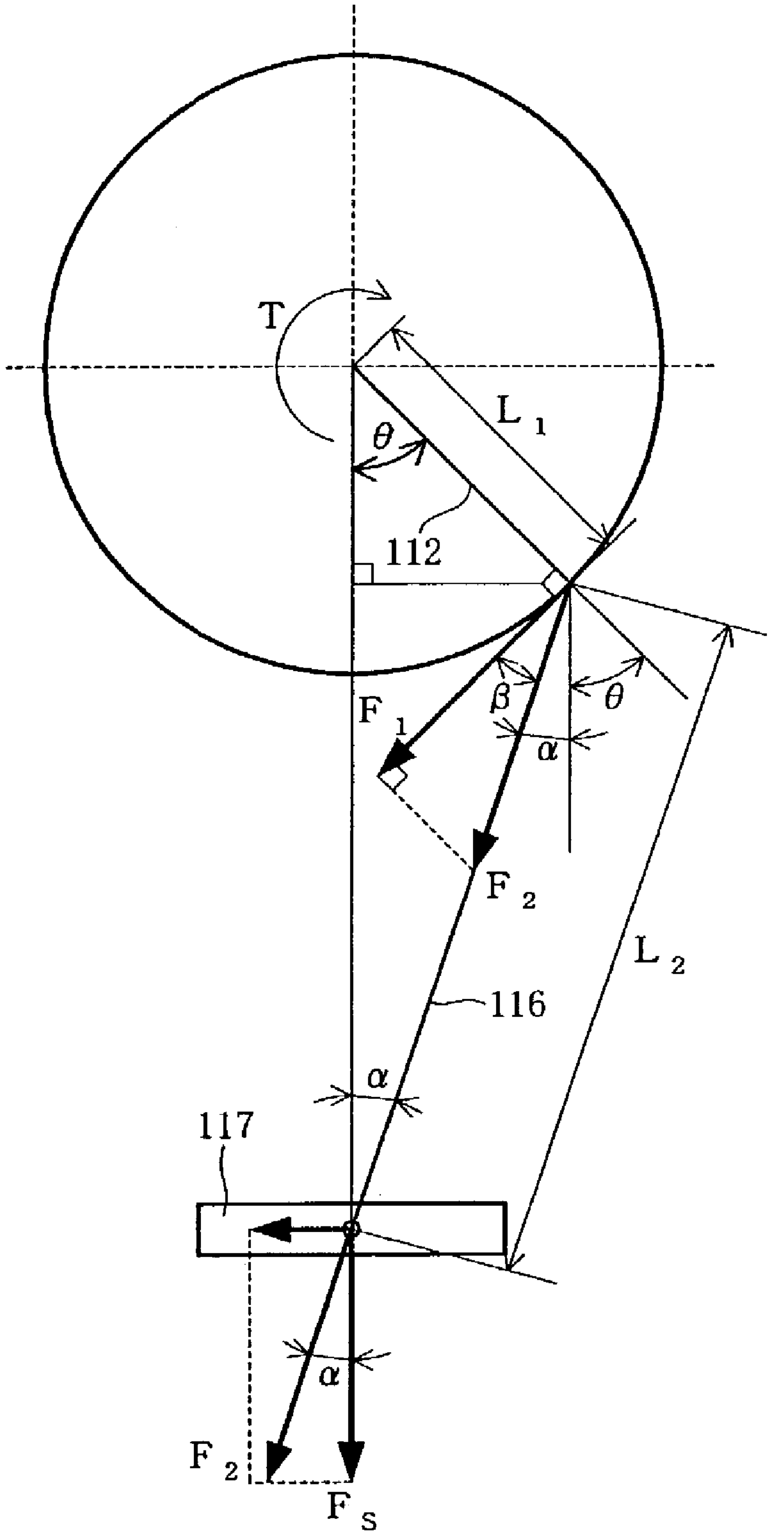
FIG. 14 is a view for explaining a relationship among torque T and rotational angle θ of a crankshaft and slide pressing force Fs (PRs)
Figure 15:
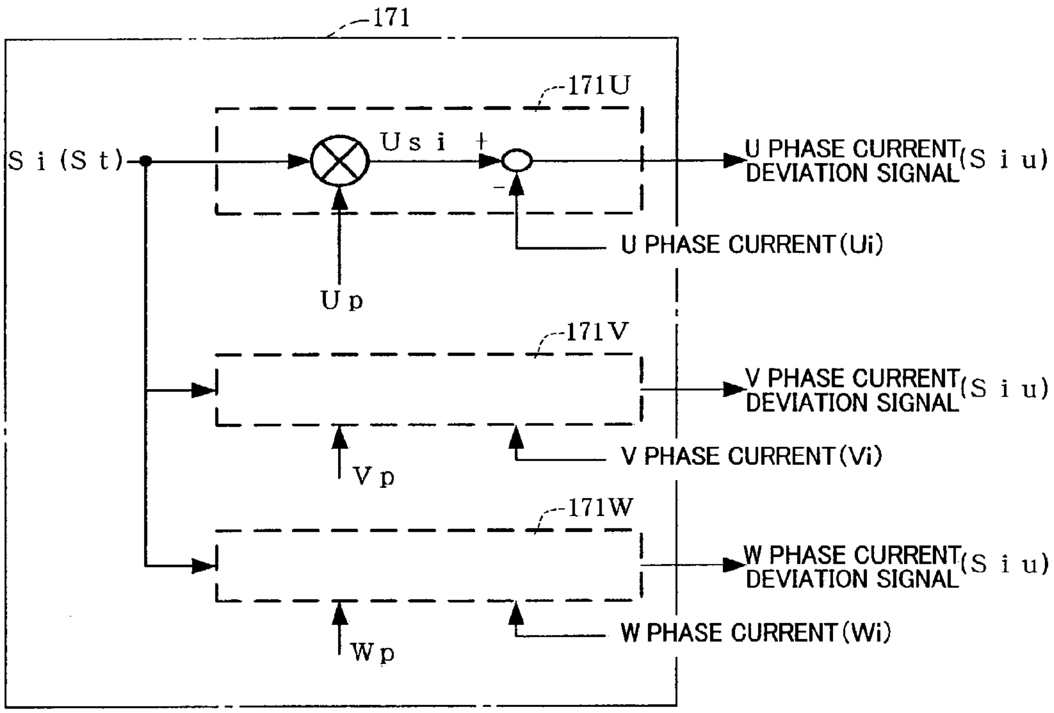
FIG. 15 is a view for explaining a current control section.

That is, an explanation will be given of a relationship (storage related information) among the crank angle θ, the slide pressing force PR and the torque T in reference to FIG. 14. In FIG. 14, when the torque of the crankshaft 112 is designated by notation T, a crank radius is designated by notation L1, a length of the connecting rod 116 is designated by notation L2, force in a crank rotating direction is designated by F1, force in a direction of the connecting rod is designated by notation F2, pressing force of the slide 117 is designated by notation Fs, an angle made by F2 and Fs is designated by notation α and an angle made by F1 and F2 is designated by notation β, the following equation is established.

$$F_s = \frac{\sqrt{1-\left(\frac{L_1}{L_2}\sin\theta\right)^2}}{L_1\sin\theta\sqrt{1-\left(\frac{L_1}{L_2}\sin\theta\right)^2}+L_2\sin\theta\cos\theta}\times T \tag{3}$$

Therefore, in order to calculate the torque T at the corresponding time from the set pressing force Fs and the crank angle θ, the following equation may be calculated.

$$T = F_s L_1\left\{\sin\theta+\frac{\frac{L_2}{L_1}\sin\theta\cos\theta}{\sqrt{1-\left(\frac{L_1}{L_2}\sin\theta\right)^2}}\right\} \tag{4}$$

Next, when the drive current of the motor is designated by notation I and a torque constant of the motor is designated by notation Kt, since T=Kt−I, the following equation is established.

$$I = \frac{F_s L_1}{K_T}\left\{\sin\theta+\frac{\frac{L_2}{L_1}\sin\theta\cos\theta}{\sqrt{1-\left(\frac{L_1}{L_2}\sin\theta\right)^2}}\right\} \tag{5}$$

Therefore, the slide pressing force PR (FS) can swiftly and accurately be calculated (detected) by using the detected crank angle θ and the detected motor drive current I.

The pressing force determining sections (CPU 181, ROM 182) compare the slide pressing force PR calculated by the pressing force calculating sections (181, 182) with the previously set slide pressing force PRs (refer to FIG. 18) and determines whether the calculated pressing force PR is larger than the set pressing force PRs (ST240, ST260).

Control signal outputting sections (CPU 181, ROM 182) generate a control signal UD for moving up the slide 117 and outputs the control signal UD to the pressing force adjusting mechanism 220 (ST250, ST270) when the calculated pressing force PR is determined to be larger than the set pressing force PR's (YES at ST240) by the pressing force determining sections (181, 182). Further, the control signal outputting sections (CPU 181, ROM 182) generate the control signal UD for moving down the slide 117 and output to the pressing force adjusting mechanism 220 (ST250, ST270) when the calculated pressing force PR is determined to be smaller than the set pressing force PRs (YES at ST260) by the pressing force determining sections (181, 182).

The control signal UD for moving up and down the slide 117 is constituted by an arbitrary set amount (for example, +1 mm, −1 mm) previously set by, for example, operating a key of the operation panel 185 and a relative distance corresponding to rise and fall of the control signal level. According to the third embodiment, the slide is constituted to move up and down by a set unit amount (for example, +0.5 mm, −0.5 mm) in order to simplify the control (ST250, ST27). Notation "+" signifies to move up the slide 117. Notation "−" signifies to move down the slide 117.

The set unit amount (for example, +0.5 mm, −0.5 mm) and necessity of controlling the pressing force (ST28, ST29) are temporarily stored in the work area of RAM 83.

According to the third embodiment, the control signal outputting sections (CPU 181, ROM 182) for generating the control signal UD and outputting the control signal UD to the pressing force adjusting mechanism 220, generate the unit control signal UD and output the unit control signal UD to the pressing force adjusting mechanism 220.

Further, according to the third embodiment, temporary stopping control sections (CPU 181, ROM 182), state switching control sections (CPU 181, ROM 182) and slide redriving control sections (CPU 181, ROM 182) are provided and the pressing force is constituted to be able to be controlled during a time period in which the slide is being stopped temporarily.

That is, the temporary stopping control sections (CPU 181, ROM 180) temporarily stop the slide 117 at a set point position (top dead center section PT0) when the unit control signal (control signal) UD is generated to output (YES at ST140 of FIG. 20, ST150). When the slide 117 is disposed before the bottom dead center position (YES at ST120), the slide 117 is temporarily stopped when "pressing force control is needed" is stored in the work area of RAM 83 (YES at ST130).

On the other hand, when "pressing force control is not needed" is stored (NO at ST130), so far as a press operation is not instructed to stop (YES at ST190), the slide 117 is continuously moved up and down without temporarily stopping at the set point position.

The state switching control sections (CPU 181, ROM 182) switches the pressing force adjusting mechanism 220 to an unlocked state during the time period in which the slide 117 is being stopped temporarily at the set point position (ST160), and switches to the locked state (ST180) after finishing increasing or decreasing the relative distance so as to be adjusted in the up-and-down direction by the unit amount (ST170). The embodiment is carried out by outputting the state switching signal RK shown in FIG. 19 to the state switching apparatus 228.

The slide redriving positions (CPU 181, ROM 182) restart to move up and down the slide 117 (NO at ST190, ST110) after the pressing force (slide position) has been finished to be controlled and after the unlocked state is switched to the locked state by the state switching control sections (181, 182) (ST180).

In the press machine 110 according to the third embodiment having such a constitution, in a state of stopping a press operation in which the crankshaft 112 is stopped at the set point position (PT0), drive control power source of the press operation drive control section (180) is made ON.

Here, when a press operation instruction is issued, the set slide position signal (position pulse) PTs is outputted (issued) based on the motion pattern (t-PT curve) selected from the motion instructing section 153.

Therefore, the position control system 160 and the current control section 171 are operated and the motor 130 is rotated regularly (for example, leftwardly) by the respective motor drive currents Iu, Iv, Iw. The slide 117 is moved down via the crankshaft 112, the connecting rod 116 and the pressing force adjusting mechanism 220 shown in FIG. 1 (YES at ST100 of FIG. 20, ST110).

The slide lowering speed at the occasion is in conformity with the motion SM (curve) based on the selected slide motion pattern shown in FIG. 18. When "automatic" is set at the speed setter (151), the slide is moved down at the highest speed. During a time period in which the slide is moving down, the crankshaft angle θ (or slide position PT) detected by the encoder 135 is inputted to the speed detector 136 for generating the feedback speed signal FS.

When the press operation drive control section (computer 180) monitors the detected crankshaft angle θ and determines that the current position of the slide 117 is disposed before the bottom dead center position (immediately before θ1 through 180° shown in FIG. 18) (YES at ST120 of FIG. 20 and YES at ST200 of FIG. 21), the pressing force calculating sections (181, 182) calculate the slide pressing force PR by using the detected motor drive current I (ST210, ST220 of FIG. 21). At this occasion, the stored set pressing force PRs is called (ST230).

Then, the pressing force determining sections (181, 182) compare the calculated slide pressing force PR with the set pressing force PRs (refer to FIG. 18) and determines whether the calculated pressing force PR is larger than the set pressing force PRs (ST240, ST260).

The control signal outputting sections (181, 182) generate the unit control signal UD for moving up the slide 117 (ST250) to output when the calculated pressing force PR is determined to be larger than the set pressing force PRs (YES at ST240). Further, the control signal outputting sections (181, 182) generate the unit control signal UD for moving down the slide 117 (ST270) to output when the calculated pressing force PR is determined to be smaller than the set pressing force PRs (YES at ST260). At this stage, the generated set unit amount (for example, +0.5 mm, −0.5 mm) and the necessity of controlling pressing force (ST280, ST290) are temporarily stored in the work area of RAM 83.

When the slide position reaches to dispose before the bottom dead center position (YES at ST110, ST120 of FIG. 20) and "pressing force control is needed" is stored (YES at ST130) (when the unit control signal UD is generated to output) the temporary stopping control sections (181, 182) temporarily stop the slide 117 at the set point position (PT0) by applying a stop signal to the position control system 160 (YES at ST140 of FIG. 20, ST150).

When "pressing force control is not needed" is stored (NO at ST130), so far as the press operation is not instructed to stop (YES at ST190), the slide 117 is continuously moved up and down without being stopped temporarily at the set point position.

The state switching control sections (CPU 181, ROM 182) switch the pressing force adjusting mechanism 220 to the unlocked state by outputting the state setting signal RK to the state switching apparatus 228 during a time period in which the slide 117 is being stopped temporarily at the set point position (ST160) and switch the pressing force adjusting mechanism 220 to the locked state (ST180) after finishing increasing or decreasing the relative distance so as to be adjusted in the up-and-down direction by the unit amount (ST170).

The slide redriving control sections (CPU 181, ROM 182) restart to move up and down the slide 117 by applying a restart signal to the position control system 160 (NO at ST190, ST110) after the pressing force adjusting mechanism 220 is switched to the locked state by the state switching control sections (181, 182) (ST180).

Further, according to the third embodiment, excellent pressing (drawing) can be carried out under constant pressing force (PRs). Due to the system of driving the crankshaft 112 by the motor 130, large pressing force PR is achieved, which is applicable to a large capacity machine. Further, since the pressing force PR is calculated from the motor drive current I, that is, it is not necessary to attach particular pressing force detecting apparatus (sensor, sensor amplifier, etc.), the apparatus can be realized at low cost and operated to control stably for a long period of time.

Further, the slide pressing force PR can automatically be controlled to be constant (PRs) before the bottom dead center position (within pressing region) in a press operation without being recognized by an operator and further, the control can be simplified owing to the unit increasing and decreasing control system.

Further, the unit increasing and decreasing control of the relative distance of the slide 117 in the up-and-down direction is carried out during a time period of being stopped at the set point position (PT0) and therefore, the relative position of the slide 117 relative to the crankshaft 12 during moving up and down the slide can firmly be ensured, the structure of the pressing force adjusting mechanism 220 can be simplified and increasing and decreasing control can be facilitated.

Fourth Embodiment

The fourth embodiment is constituted as a correction increasing and decreasing control system whereas the case of the third embodiment is constituted by the unit increasing and decreasing control system, although the basic constitution and function of the fourth embodiment is the same as that of the third embodiment (FIG. 11 through FIG. 21).

That is, according to the pressing force adjusting mechanism 220, the relative distance between the crankshaft 112 and the slide 117 in the up-and-down direction can be controlled to extract and detract by a correction control signal UD in the unlocked state. Further, the pressing force adjusting mechanism 220 can hold the relative distance in the up-and-down direction after finishing control of increasing and decreasing the relative distance by the correction control signal as it is in the locked state. The control signal outputting sections (CPU 181, ROM 182) of the pressing force adjusting mechanism 220 is constituted to be able to generate the correction control signal UD to enable to hold the set pressing force PRs by moving up the slide to output to the pressing force adjusting mechanism 220 when the calculated pressing force PR is determined to be larger than the set pressing force PRs by a constant pressing force value (for example, PRs×0.5%) or more. Further, the control signal outputting sections (CPU 181, ROM 182) are constituted to be able to generate the correction control signal UD to enable to hold the set pressing force PRs by moving down the slide to output to the pressing force adjusting mechanism 220 when the calculated pressing force is determined to be smaller than the set pressing force by the constant pressing force value or more. That is, there is constructed a constitution of carrying out correction for canceling the slide position deviation (pressing force control).

Further, the pressing force calculating sections, the pressing force determining sections, the temporary stopping control sections, the state switching control sections and the slide redriving control sections are similar to those of the case of the third embodiment.

According to the fourth embodiment having such a constitution, similar to the case of the third embodiment, the slide 117 is moved up and down by controlling to rotate the crankshaft 112 by the motor 130 and therefore, large pressing force is achieved.

In a press operation, when the slide pressing force PR calculated by utilizing the rotational angle θ of the crankshaft and the motor drive current I detected before the bottom dead center position is larger than the previously set pressing force PRs by a constant pressing force value (for example, PRs×0.5%) or more, the control signal outputting sections (CPU 181, ROM 182) generate the correction control signal (+UD) for moving up the slide 117 by an amount in correspondence with the constant pressure value (for example, +(PRs×0.5%)) to output to the pressing force adjusting mechanism 220.

Conversely, when the calculated slide pressing force PR is determined to be smaller than the set pressing force PRs by a constant pressing force value (for example, PRs×0.5%) or more, the correction control signal (−UD) for moving down the slide 117 by an amount in correspondence with the constant pressure value (for example, −(PRs×0.5%)) is generated and outputted to the pressing force adjusting mechanism 220.

Then, the pressing force adjusting mechanism 220 controls to extract or detract the relative distance between the crankshaft 112 and the slide 117 in the up-and-down direction by an amount (distance) in correspondence with the constant pressing force value by the correction control signal UD. Further, the locked state which can hold the relative distance in the up-and-down direction after finishing control of correction to extract or detract the relative distance as it is can be constituted. That is, the slide pressing force PR at a vicinity of the bottom dead center position (within pressing region) can automatically be controlled to be constant (PRs) without being recognized by the operator during the press operation.

Further, according to the fourth embodiment, operational effect similar to those of the case of the third embodiment can be achieved and further, when the pressing force is changed to be higher or lower than the set pressing force PRs by the constant pressing force value or more, the relative distance can be controlled to correct to extract or detract by an amount corresponding to a change to be higher or lower and therefore, the slide pressing force at every time can be held to be equal to the set pressing force accurately.

Fifth Embodiment

According to the fifth embodiment, the basic constitution and function are made to be similar to those of the cases of the third and fourth embodiments (FIG. 1 through FIG. 21). According to the third and fourth embodiments, the speed setter 151, the motion pattern selector 152 and the motion instructing section 153 are constituted like software utilizing the constituent elements of the computer 180. However, the fifth embodiment is constructed by using hardware (setter, sequencer, logic circuit and the like). Therefore, burden of the computer 180 can be alleviated.

That is, the speed setter 151 in FIG. 12 is constituted by the operation panel 185 constituting a section of the computer 180 shown in FIG. 19 and the motion pattern selector 152 and the motion instructing section 153 are constituted by the operation panel 155, CPU 181, ROM 182 and RAM 183 shown in FIG. 19.

Further, according to the fifth embodiment, by only exchanging storage related information, a variety of slide motions can selectively be utilized and therefore, in comparison with the cases of the third and fourth embodiments, the adaptability to the pressing mode and the like can further be enlarged and also a reduction in cost can also be achieved. The storage related information can be constituted by a data table, so-to-speak data base in correspondence with the respective relationships according to, for example, the third Embodiment.

Sixth Embodiment

According to the sixth embodiment, the basic constitution and function are made to be similar to those of the cases of the third (fourth, fifth) (FIG. 11, FIG. 12, FIG. 14 through FIG. 21) except a constitution of a pressing force adjusting mechanism 250. However, according to the sixth embodiment, steps indicated in ST160 and ST180 in FIG. 20 are not needed.

Figure 22:
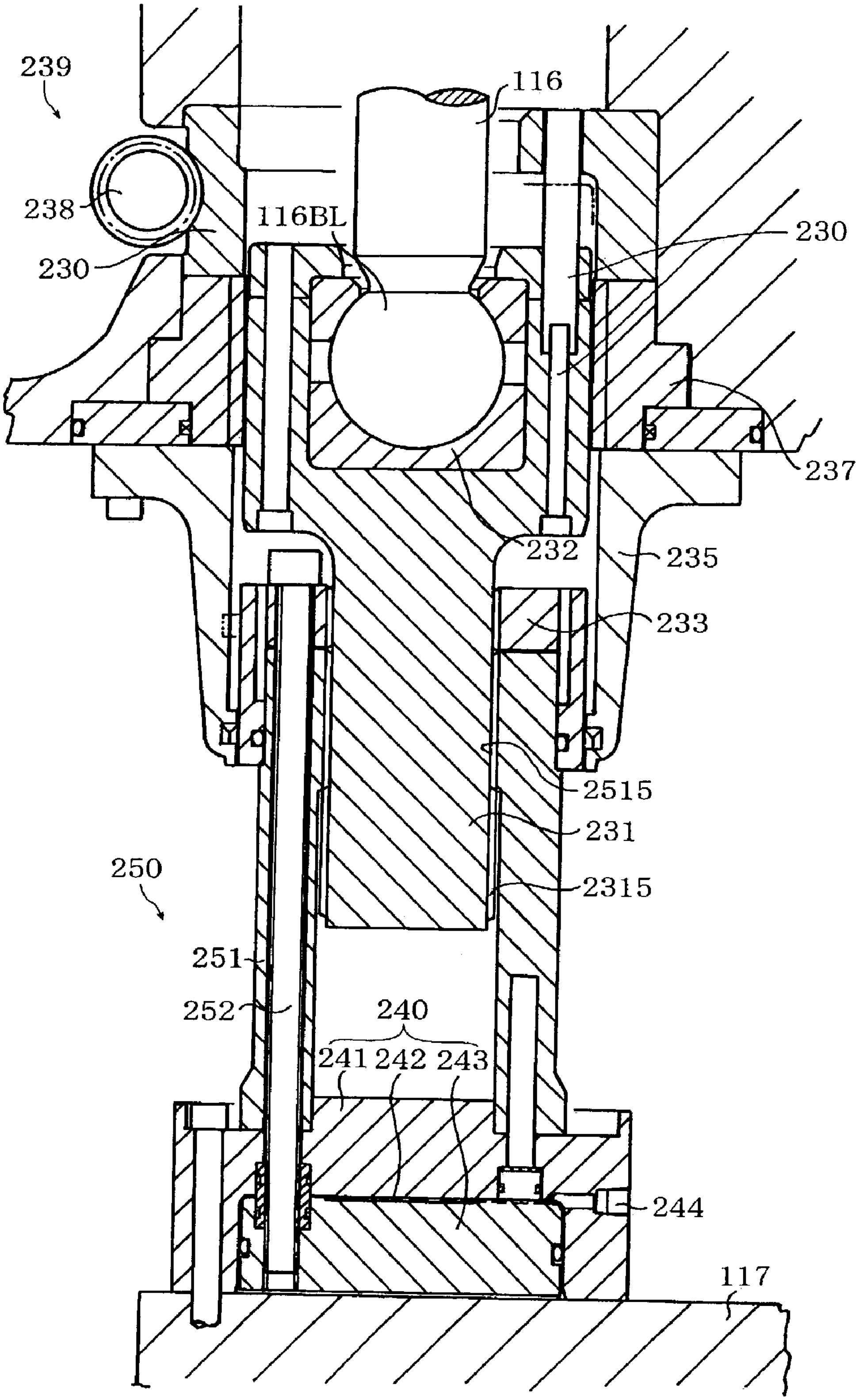
FIG. 22 is a vertical sectional view for explaining a pressing force adjusting mechanism according to a sixth embodiment of the invention.

In FIG. 22, the pressing force adjusting mechanism 250 according to the sixth embodiment is integrally formed with a die height control screw mechanism (die height control mechanism) 230. Therefore, the pressing force adjusting mechanism 250 can control to extract and detract the relative distance between the crankshaft 112 and the slide 117 in the up-and-down direction by a control signal without switching the unlocked state and the locked state. Further, the pressing force adjusting mechanism 250 is constituted to be able to hold the relative distance in the up-and-down direction after finishing increasing or decreasing the relative distance so as to be adjusted by the control signal as it is.

That is, the die height control screw mechanism 230 having comparatively broad range of controlling the slide in the up-and-down direction is restrained inoperably by a lock nut 231. However, the pressing force adjusting mechanism 250 having a comparatively narrow change of controlling the slide in the up-and-down direction is constituted to be able to control the slide pressing force while elastically expanding or contracting an expanding and contracting drive member (hollow cylinder member 251) provided between the pressing force adjusting mechanism 250 and the slide 117 regardless of whether pressing is being operated or stopped. Further, the pressing force adjusting mechanism 250 is constituted to be able to control the slide pressing force similarly regardless of whether the slide is brought into the unlocked state or the locked state.

Specifically, as shown by FIG. 22, the die height control screw mechanism 230 includes a control screw shaft 131 having a spherical bearing 232 engaged with a spherical member 116BL provided at a lower end of the connecting rod 116 and connected to a worm wheel 230. Further, the die height control mechanism 230 includes a lock nut 233 for locking the control screw shaft 231 and a worm screw shaft 238 screwed with the worm wheel 130 and a motor (not illustrated) for driving to rotate the screw shaft 238. Further, the die height control screw mechanism 230 includes a hollow cylinder member 251, an upper section of the hollow cylinder member 251 is screwed to the control screw shaft 231 via screws 231S, 251S and a lower section of the hollow cylinder member 251 is fixed to the slide 117 via a cylinder apparatus 240. Further, in FIG. 22, notation 235 designates a case and notation 234 designates a guide member.

Therefore, by releasing pressurized oil in a cylinder chamber 242 constituting the cylinder apparatus 240 and nullifying fastening force by a bolt member 252, the lock nut 233 is fastened. Further, when the worm screw shaft 238 is pivoted, the control screw shaft 231 (male screw 231S) is pivoted relative to the hollow cylinder member 251 (female screw 251S) fixed to the slide 117 via the worm wheel 230 and a pin member 234 inserted over to the wheel 230 and the control screw shaft 231. Therefore, a die height (bottom dead center position in up-and-down direction) can be controlled by moving the slide 117 in the up-and-down direction.

Next, the expanding and contracting drive member (251) constituting the pressing force adjusting mechanism 250 is arranged between the slide 117 and the die height control screw mechanism 230 and formed to be able to extract and detract in the axial line direction. According to the embodiment, the expanding and contracting drive member is formed by the hollow cylinder member 251 constituting a section of the die height control screw mechanism 230. Further, expanding and contracting force providing means is means for elastically expanding and contracting the member (251) by exerting expanding and contracting force to the expanding and contracting drive member (hollow cylinder member 251) and is constituted by the bolt member 252, the cylinder apparatus 240 and a hydraulic pressure supply section (hydraulic pressure supply port 244 and switch control valve and hydraulic pressure source or the like, not illustrated).

The cylinder apparatus 240 is constituted by a cylinder 241 fixedly attached to the slide 117 and a piston 243 contained in the cylinder chamber 242 movably in the up-and-down direction. The cylinder 241 is formed with the hydraulic pressure supply port 244 for supplying hydraulic pressure between an upper end face in the cylinder chamber 242 and the piston 243.

Further, the bolt member 252 is embedded in the hollow cylinder member 251 movably in the up-and-down direction, a lower end thereof is fixedly attached to the piston 243 and other end thereof is integrally connected to the hollow cylinder member 251 via the lock nut 233.

Further, the hydraulic pressure supply section is formed to be able to supply hydraulic pressure at predetermined pressure value (for example, minimum pressure Pr0 through maximum pressure Pr2) into the cylinder chamber 242 of the cylinder apparatus 240. Further, the hydraulic pressure supply section is constituted by a hydraulic pressure source, not illustrated, and an electro-hydraulic servo mechanism (electro-hydraulic servo valve, pressure sensor, servo amplifier and the like) interposed in a pipe for connecting the hydraulic pressure source and the hydraulic pressure supply port 244 of the cylinder 241 for controlling inner pressure of the cylinder chamber 242 based on a control signal (for example, in prosection to control signal).

In this case, when hydraulic pressure is supplied into the cylinder chamber 242, the bolt member 252 is elongated by being pulled in a state in which the other end is fixed to the hollow cylinder member 251 to thereby push to contract the hollow cylinder member 251. Thereby, the slide 117 is moved upwardly by an amount of contracting the hollow cylinder member 251.

A relationship between the inner pressure Pri of the cylinder apparatus 240 and an expanding and contracting amount δ of the hollow cylinder member 251 is specified as follows. That is, when the inner pressure Pri in the cylinder chamber 242 is varied from the minimum pressure value Pr0 to the maximum pressure value Pr2, the hollow cylinder member 251 is deformed by a maximum deformation amount ($b-1=\delta r$). Therefore, when a middle value (substantially central value) between Pr0 and Pr2 is previously applied in the cylinder chamber 142 as initial inner pressure Pr1 and the inner pressure is increased from the state, the hollow cylinder member 251 is contracted by an amount of increasing the inner pressure. Further, when the inner pressure Pri is conversely reduced from the initial pressure Pr1, the hollow cylinder member 251 is elongated by an amount of reducing the inner pressure.

Further, the expanding and contracting amount δ of the hollow cylinder member 251 relative to arbitrary inner pressure Pri (($pr0 \leqq Pri \leqq Pr2$) is uniquely calculated based on the value of the inner pressure Pri. According to the embodiment, the above-described initial inner pressure Pr1 is selected such that a maximum elongation value and a maximum contraction amount of the hollow cylinder member 251 become equal to each other. Thereby, even when the relative distance between the crankshaft 112 and the slide 117 in the up-and-down direction is changed by a variation in the bottom dead center position in the upper direction and the lower direction, the relative distance can precisely be held to a predetermined distance (that is, pressing force).

Further, according to the sixth embodiment, operational effect similar to those of the third (fourth, fifth) embodiments can be achieved. Further, according to the sixth embodiment, the pressing force adjusting mechanism 250 is constituted to include the hollow cylinder member 251 and expanding and contracting force exerting means (bolt member 252, cylinder apparatus 240, hydraulic pressure supply section) and to be able to control to correct automatically a change in the pressing force (bottom dead center position) by controlling the expanding and contracting amount of the hollow cylinder member 251 with no need of concept and specific operation of lock releasing. Therefore, according to the sixth embodiment, the change in the pressing force (bottom dead center position) during the press operation can be controlled swiftly, quantitatively and highly accurately. An accuracy of a predetermined product can stably be held constantly.

Further, the hollow cylinder member 251 is constructed by a constitution of controlling the pressing force by being elongated or contracted elastically within the range of δr (=b−a) and therefore, the slide 117 is not moved down infinitely and therefore, the pressing force can be controlled extremely safely.

Further, when the hollow cylinder member 251 is extracted or detracted, the female screw 251S of the hollow cylinder member 251 and the male screw 231S of the control screw shaft 231 apply pressure to each other in the axial line direction to thereby lock the control screw shaft 231. Therefore, the pressing force adjusting mechanism (bottom dead center position correcting apparatus) can also serve as a section of locking the control screw shaft 231.

Further, the expanding and contracting drive member (251) can be formed by a piezo actuator achieving the piezoelectric effect and the expanding and contracting force providing means can be formed by a piezo drive section (high voltage power source apparatus, charge injecting circuit, charge discharging circuit) for forcibly driving to extract and detract by applying high pressure power source to the piezo actuator. Further, the slide pressing force may be constituted to be controlled by automatically controlling the expanding and contracting amount of the piezo actuator by driving the piezo drive section based on the control signal.

That is, there can be constructed a constitution in which the hollow cylinder member 251 is fixed to the slide 117 by a bolt member (structure similar to the bolt member 252) and a piezo actuator is interposed between the slide 117 and the hollow cylinder member 251 in place of the cylinder apparatus 240. Further, an interval between the slide 217 interposed with the piezo actuator and the die height control screw mechanism 230 is controlled to cancel a change in the bottom dead center position and therefore, the slide pressing force (slide bottom dead center position) can automatically be controlled swiftly, safely and accurately while the die height control screw mechanism 230 is brought into the locked state even in the press operation.

The invention claimed is:

1. A press machine comprising:

a crankshaft;

a motor connected to the crankshaft and driven to rotate reversibly;

a slide moving up and down by rotation of the motor;

a control section controlling the up and down movement of the slide; and a motor drive control section controlling the drive of the motor based on an output from the control section, wherein the control section comprises a position control system, a control mode switching control section and a pressing force control system, wherein the position control system moves down the slide from an initial position to a pressing region by controlling the motor to rotate regularly;

wherein when the slide is determined to exist in the pressing region, the control mode switching control section substitutes the position control system with the pressing force control system; and wherein the pressing force control system performs pressing by moving down the slide such that a slide pressing force becomes equal to a set pressing force by controlling the motor to rotate regularly.

2. The press machine as defined in claim 1, wherein the control mode switching control section substitutes the pressing force control system with the position control system after completing the pressing and after the slide reaches a position before a bottom dead center, and wherein the position control system moves up the slide to the initial position by controlling the motor to rotate reversibly.

3. The press machine as defined in claim 1, wherein the position control system controls the position of the slide in accordance with a set slide position signal outputted based on a set motion instructing pattern.

4. The press machine as defined in claim 1, wherein the pressing force control system controls the slide pressing force in accordance with a set slide pressing force signal outputted based on a set pressing force instructing pattern.

5. The press machine as defined in claim 4, wherein the set slide pressing force signal is outputted as a torque value of the motor calculated by inputting a detected rotational angle of the crankshaft to a relational expression of the rotational angle of the crankshaft, the slide pressing force and a torque of the motor.

6. The press machine as defined in claim 4, wherein the set slide pressing force signal is outputted as a torque value of the motor which is read by comparing a detected rotational angle of the crankshaft with storage information storing a relationship among the rotational angle of the crankshaft, the slide pressing force and a torque of the motor.

7. The press machine as defined in claim 2, wherein a completion of the pressing is detected by monitoring one of an elapsed time period and a rotational angle of the crankshaft.

8. A press machine comprising:

a crankshaft;

a motor connected to the crankshaft;

a slide moving up and down by rotation of the motor; and a control section controlling the up and down movement of the slide;

wherein the control section comprises:

a pressing force adjusting mechanism adjusting a relative distance between the crankshaft and the slide in an up-and-down direction;

a pressing force calculating section calculating a pressing force exerted on the slide as a calculated pressing force;

a pressing force determining section comparing the calculated pressing force with a set pressing force; and a control signal outputting section outputting a unit control signal, wherein the pressing force calculating section calculates the pressing force exerted on the slide based on a rotational angle of the crankshaft and a motor drive current both of which are detected before a bottom dead center position, wherein the pressing force determining section determines whether the calculated pressing force is larger than the set pressing force, wherein when the calculated pressing force is determined to be larger than the set pressing force, the control signal outputting section generates the unit control signal for moving up the slide and outputs to the pressing force adjusting mechanism, wherein when the calculated pressing force is determined to be smaller than the set pressing force, the control signal outputting section generates the unit control signal for moving down the slide and outputs to the pressing force adjusting mechanism, and wherein the pressing force adjusting mechanism increases or decreases the relative distance so as to be adjusted by moving the slide up or down by a set amount, and maintains the adjusted relative distance after finishing the adjustment.

9. The press machine as defined in claim 8, further comprising:

a temporary stop control section temporarily stopping the slide after passing the bottom dead center position, at a set point position when the unit control signal is generated and outputted; and a slide redriving control section restarting the up and down movement of the slide after the adjustment of the relative distance performed while the slide is being stopped temporarily at the set point position.

10. The press machine as defined in claim 8, wherein the pressing force adjusting mechanism increases or decreases the relative distance so as to be adjusted by a unit control signal in an unlocked state, and maintains the relative distance which has been adjusted by the unit control signal during a locked state.

11. A press machine comprising:

a crankshaft;

a motor connected to the crankshaft;

a slide moving up and down by rotation of the motor; and a control section controlling the up and down movement of the slide;

wherein the control section comprises:

a pressing force adjusting mechanism adjusting a relative distance between the crankshaft and the slide in an up-and-down direction;

a pressing force calculating section calculating a pressing force exerted on the slide as a calculated pressing force;

a pressing force determining section comparing the calculated pressing force with a set pressing force; and a control signal outputting section outputting a control signal, wherein the pressing force calculating section calculates the pressing force exerted on the slide based on a rotational angle of the crankshaft and a motor drive current both of which are detected before a bottom dead center position, wherein the pressing force determining section determines whether the calculated pressing force is larger than the set pressing force, wherein when the calculated pressing force is determined to be larger than the set pressing force, the control signal outputting section generates the control signal for moving up the slide and outputs to the pressing force adjusting mechanism, wherein when the calculated pressing force is determined to be smaller than the set pressing force, the control signal outputting section generates the control signal for moving down the slide and outputs to the pressing force adjusting mechanism, and wherein the pressing force adjusting mechanism increases or decreases the relative distance so as to be adjusted by the control signal in an unlocked state, and maintains the relative distance which has been adjusted by the control signal during a locked state, said press machine further comprising;

a temporary stop control section temporarily stopping the slide after passing the bottom dead center position at a set point position when the control signal is generated and outputted;

a state switching control section switching the pressing force adjusting mechanism to the unlocked state while the slide is being temporarily stopped at a set point position, and switching the pressing force adjusting mechanism to the locked state after the relative distance has been adjusted; and a slide redriving control section restarting the up and down movement of the slide after being switched to the locked state by the state switching control section.

* * * * *